United States Patent
Lu et al.

(10) Patent No.: US 11,611,992 B2
(45) Date of Patent: Mar. 21, 2023

(54) BANDWIDTH EXTENSION INDICATION AND NEGOTIATION IN WIRELESS COMMUNICATIONS

(71) Applicant: MediaTek Singapore Pte. Ltd., Singapore (SG)

(72) Inventors: Kai Ying Lu, San Jose, CA (US); Yongho Seok, San Jose, CA (US); James Chih-Shi Yee, San Jose, CA (US); Chao-Chun Wang, San Jose, CA (US); Jianhan Liu, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 96 days.

(21) Appl. No.: 17/350,483

(22) Filed: Jun. 17, 2021

(65) Prior Publication Data
US 2021/0400727 A1 Dec. 23, 2021

Related U.S. Application Data

(60) Provisional application No. 63/040,558, filed on Jun. 18, 2020, provisional application No. 63/045,210, filed on Jun. 29, 2020, provisional application No. 63/073,531, filed on Sep. 2, 2020.

(51) Int. Cl.
*H04W 74/08* (2009.01)
*H04L 1/00* (2006.01)
*H04W 80/02* (2009.01)

(52) U.S. Cl.
CPC ....... *H04W 74/0816* (2013.01); *H04L 1/0068* (2013.01); *H04W 80/02* (2013.01)

(58) Field of Classification Search
CPC . H04W 74/0816; H04W 80/02; H04W 28/20; H04W 72/042; H04W 74/002; H04W 84/12; H04W 72/0426; H04L 1/0068; H04L 5/001; H04L 5/0053; H04L 5/0096; H04L 41/0896
See application file for complete search history.

(56) References Cited

U.S. PATENT DOCUMENTS

| | | |
|---|---|---|
| 2012/0106426 A1 | 5/2012 | Hart et al. |
| 2012/0243485 A1 | 9/2012 | Merlin et al. |
| 2019/0141570 A1 | 5/2019 | Verma et al. |
| 2020/0162963 A1 | 5/2020 | Alpert et al. |
| 2021/0105667 A1* | 4/2021 | Li ...................... H04W 74/002 |

(Continued)

FOREIGN PATENT DOCUMENTS

| | | |
|---|---|---|
| EP | 3799497 A1 | 12/2019 |
| WO | WO 2019242658 A1 | 12/2019 |

OTHER PUBLICATIONS

BW indication of 320MHz for non-HT and non-HT duplicate frames, Date: Apr. 10, 2020, IEEE; submitted in IDS, identified as D3 in ISR. (Year: 2020).*

(Continued)

*Primary Examiner* — Mohammed S Chowdhury
(74) *Attorney, Agent, or Firm* — Han IP PLLC; Andy M. Han

(57) ABSTRACT

A first station (STA) and a second STA perform bandwidth negotiation with a bandwidth extension indication. Then the first STA and the second STA communicate wirelessly according to the bandwidth negotiation.

19 Claims, 15 Drawing Sheets

(56) References Cited

U.S. PATENT DOCUMENTS

2021/0250119 A1* 8/2021 Noh ................. H04L 1/0033
2021/0336720 A1* 10/2021 Chu ................. H04L 1/0069

OTHER PUBLICATIONS

IEEE: BW Negotiation, TXOP Protection with >160MHz PPDU and Puncture Operation; Name: Liwen Chu, Young Hoon Kwon, Manish Kumar, Hongyuan Zhang, Yan Zhang, Rui Cao, Sudhir Srinivasa, Hui-Ling Lou, Affiliations: NXP; Date: Jan. 6, 2020. (Year: 2020).*

IEEE: BW Negotiation, TXOP Protection with >160MHz PPDU and Puncture Operation; Name: Liwen Chu, Young Hoon Kwon, Manish Kumar, Hongyuan Zhang, Yan Zhang, Rui Cao, Sudhir Srinivasa, Hui-Ling Lou, Affiliations: NXP; Date: Mar. 1, 2020. (Year: 2020).*

European Patent Office, Extended European Search Report for European Patent Application No. 21180251.7, dated Nov. 24, 2021.

Liwen Chu et al., "BW Negotiation, TXOP Protection with >160MHz PPDU and Puncture Operation", Doc: IEEE 802.11-20/0062r0, Jan. 6, 2020.

Yunho Li et al., "BW indication of 320MHz for non-HT and non-HT duplicate frames", Doc: IEEE 802.11-20/0616r0, Apr. 10, 2020.

Taiwan Intellectual Property Office, Office Action for Taiwan Patent Application No. 110122372, dated Apr. 27, 2022.

* cited by examiner

| FIRST 7 BITS OF SCRAMBLING SEQUENCE | B0~B2 | | B3 | B4 | B5~B6 | BANDWIDTH (MHZ) |
|---|---|---|---|---|---|---|
| RTS | ScramblingSequenceStart3 | ScramblingSequenceStart4 | 0 | Static / Dynamic | 0 0 | 20 |
| | | | 0 | | 0 1 | 40 |
| | | | 0 | | 1 0 | 80 |
| | | | 1 | Reserved | 1 0 | 160/80+80 |
| | | | 1 | | 0 1 | 240/160+80 |
| | | | 1 | | 1 0 | 320/160+160 |
| | Reserved | Reserved | | | 1 1 | Reserved |
| | Reserved | Reserved | | | | Reserved |
| FIRST 7 BITS OF SCRAMBLING SEQUENCE | B0~B3 | | | | B4~B6 | BANDWIDTH (MHZ) |
| CTS | ScramblingSequenceStart4 | | | | SAME COMBINATIONS AS FOR RTS | |

| | First 7 Bits of Scrambling Sequence | | | Reserved Service Bits (4 Bits) | |
|---|---|---|---|---|---|
| | B0~B3 | B4 | B5~B6 | R0~R3 | Bandwidth (MHz) |
| RTS | ScramblingSequence Start4 | Static / Dynamic | 6 bits indicating total of 64 combinations | | Bandwidths with all supported preamble puncturing patterns |
| | B0~B4 | | B5~B6 | R0~R3 | Bandwidth (MHz) |
| CTS | ScramblingSequence Start5 | | 6 bits indicating total of 64 combinations | | Bandwidths with all supported preamble puncturing patterns |

FIG. 3

| First 7 bits of scrambling sequence | | | |
|---|---|---|---|
| B0~B3 | B4 | B5~B6 | Bandwidth (MHz) |
| ScramblingSequenceStart3 | Static / Dynamic | 0  0 | Primary 160+80 |
| | | 0  1 | Primary 80+160 |
| | | 1  0 | 320/160+160 |
| | | 1  1 | Reserved |

RTS (when indicated as extended signaling TA)

| First 7 bits of scrambling sequence | | |
|---|---|---|
| B0~B3 | B4~B6 | Bandwidth (MHz) |
| ScramblingSequenceStart4 | 0  0  0 | 20 |
| | 0  0  1 | 40 |
| | 0  1  0 | 80 |
| | 0  1  1 | 160 (80+80) |
| | 1  0  0 | Primary 160+80 |
| | 1  0  1 | Primary 80+160 |
| | 1  1  0 | 320/160+160 |
| | 1  1  1 | Reserved |

CTS

| Bits | First 7 bits of Scrambling Sequence | | | | B7~B15 bits in Service field | |
|---|---|---|---|---|---|---|
| | B0~B3 | B4 | B5~B6 | | B7 | B8~B15 |
| CH_BANDWIDTH_IN_NON_HT is present and INDICATION_DYN_BANDWIDTH is present in TXVECTOR | ScramblingSequenceStart4 | INDICATION_DYN_BANDWIDTH | CH_BANDWIDTH | | EXTENDED_CH_BANDWIDTH | Reserved |
| CH_BANDWIDTH_IN_NON_HT is present and INDICATION_DYN_BANDWIDTH is not present | ScramblingSequenceStart5 | | | | | |

FIG. 8

| Bits | First 7 Bits of Scrambling Sequence | | | B7~B15 Bits in Service Field | |
|---|---|---|---|---|---|
| | B0~B3 | B4 | B5~B6 | B7 | B8~B15 |
| EHT RTS | ScramblingSequence Start4 | Indication_ Dyn_ Bandwidth | CH_Bandwidth | Extended_ CH_ Bandwidth | Reserved |

| Bits | First 7 bits of Scrambling Sequence | | | B7~B15 bits in Service Field | |
|---|---|---|---|---|---|
| | B0~B4 | B5~B6 | | B7 | B8~B15 |
| EHT CTS | ScramblingSequenceStart5 | CH_BANDWIDTH | | EXTENDED_CH_BANDWIDTH | RESERVED |

BANDWIDTH EXTENSION INDICATION AND NEGOTIATION IN WIRELESS COMMUNICATIONS

CROSS REFERENCE TO RELATED PATENT APPLICATION

The present disclosure is part of a non-provisional patent application claiming the priority benefit of U.S. Provisional Patent Application Nos. 63/040,558, 63/045,210 and 63/073,531, filed 18 Jun. 2020, 29 Jun. 2020 and 2 Sep. 2020, respectively, the contents of which being incorporated by reference in their entirety.

TECHNICAL FIELD

The present disclosure is generally related to wireless communications and, more particularly, to bandwidth extension indication and negotiation in wireless communications.

BACKGROUND

Unless otherwise indicated herein, approaches described in this section are not prior art to the claims listed below and are not admitted as prior art by inclusion in this section.

In next-generation wireless communications such as those in extreme-high-throughput (EHT) wireless local area networks (WLANs) based on an Institute Electrical and Electronics Engineers (IEEE) standard including IEEE 802.11be and beyond, each 80 MHz frequency segment can support some patterns of puncturing based on EHT signal field B (EHT SIG B) content channel design "1212". In each of 320 MHz non-orthogonal frequency-division multiple access (non-OFDMA), 240 MHz non-OFDMA, 160 MHz non-OFDMA, and 80 MHz non-OFDMA, certain conditional mandatory (conditional on supporting puncturing) large resource unit (RU) combinations are supported. In particular, in 320 MHz non-OFDMA, total 10 options of puncturing (excluding the primary 80 MHz segment) can be indicated by 4 bits. In 240 MHz non-OFDMA, total 7 options of puncturing (excluding the primary 80 MHz segment) can be indicated by 3 bits. In 160 MHz non-OFDMA, total 10 options of puncturing (excluding the primary 80 MHz segment) can be indicated by 4 bits. In 80 MHz non-OFDMA, total 3 options of puncturing (excluding the primary 20 MHz segment) can be indicated by 2 bits.

With respect to bandwidth indication and puncturing support, based on the bandwidth of an initiator, a responder needs to negotiate the bandwidth and puncturing pattern to be used. In order to support a maximum of 320 MHz physical-layer protocol data unit (PPDU) bandwidth indication, 6 bits are needed to indicate the potential negotiated bandwidth for total 33 aggregated bandwidths, or multiple RUs (MRUs), with puncturing patterns and total 6 bandwidths (e.g., 20 MHz, 40 MHz, 80 MHz, 160 MHz, 240 MHz and 320 MHz). However, at the present time it is unclear as to how to use legacy request-to-send (RTS)/clear-to-send (CTS) frames or other control frames for bandwidth indication and static/dynamic bandwidth negotiation in order to enable channel protection and network allocation vector (NAV) reset when necessary. Therefore, there is a need for a solution of bandwidth extension indication and negotiation to address this issue.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to bandwidth extension indication and negotiation in wireless communications. Under various proposed schemes in accordance with the present disclosure, it is believed that aforementioned issue may be addressed or otherwise alleviated.

In one aspect, a method may involve performing bandwidth negotiation between a first station (STA) and a second STA with a bandwidth extension indication. The method may also involve communicating wirelessly between the first STA and the second STA according to the bandwidth negotiation.

In another aspect, an apparatus may include a transceiver and a processor coupled to the transceiver. The transceiver may be configured to communicate wirelessly. The processor may be configured to perform, via the transceiver, bandwidth negotiation between a first STA and a second STA with a bandwidth extension indication. The processor may also be configured to communicate, via the transceiver, between the first STA and the second STA according to the bandwidth negotiation.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5$^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 3 is a diagram of an example design in accordance with the present disclosure.

FIG. 8 is a diagram of an example design in accordance with the present disclosure.

FIG. 9 is a diagram of an example design in accordance with the present disclosure.

FIG. 10 is a diagram of an example design in accordance with the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to bandwidth extension indication and negotiation in wireless communications. According to the present disclosure, a number of possible solutions may be implemented separately or jointly. That is, although these possible solutions may be described below separately, two or more of these possible solutions may be implemented in one combination or another.

Figure 1:
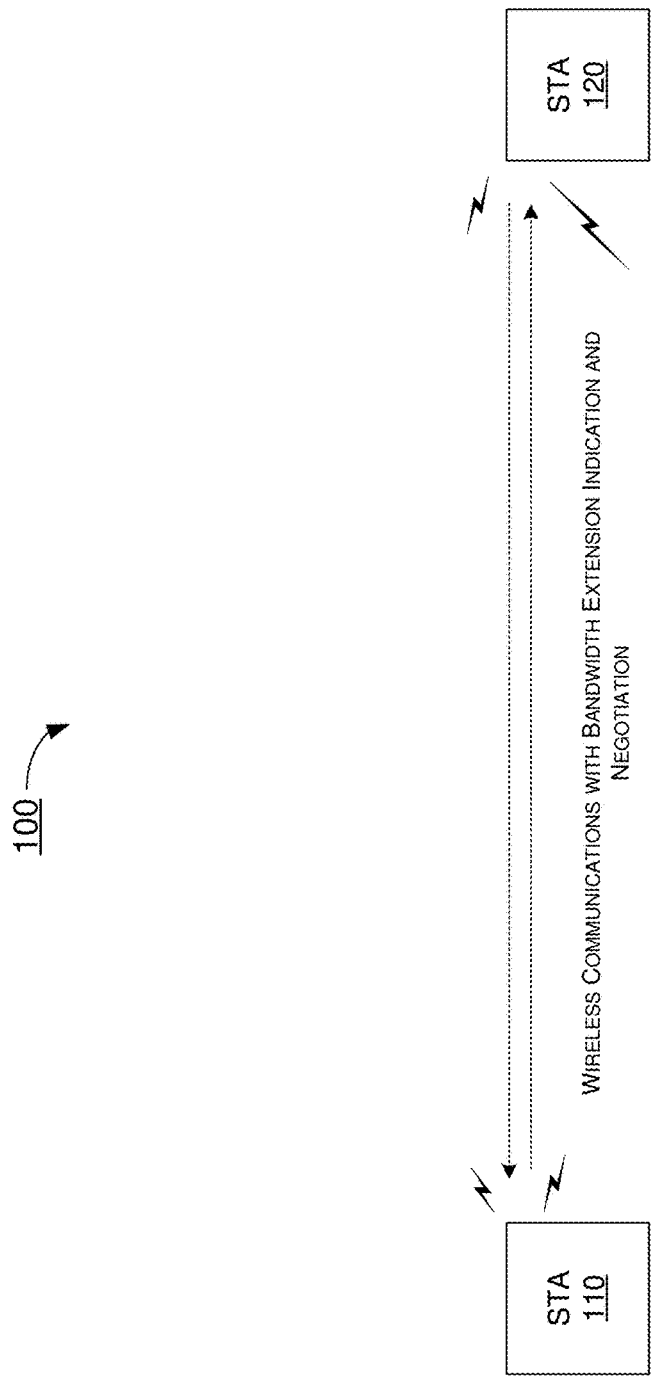
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 15 illustrate examples of implementation of various proposed schemes in network environment 100 in accordance with the present disclosure. The following description of various proposed schemes is provided with reference to FIG. 1~FIG. 15.

Referring to FIG. 1, network environment 100 may involve at least a STA 110 and a STA 120 may be communicating wirelessly with each other in accordance with one or more IEEE 802.11 standards (e.g., IEEE 802.11be and beyond). Each of STA 110 (herein interchangeably denoted as "STA1") and STA 120 (herein interchangeably denoted as "STA2") may function as an access point (AP) station (STA) or a non-AP STA. Moreover, each of STA 110 and STA 120 may be configured to perform bandwidth extension indication and negotiation in wireless communications in accordance with various proposed schemes described below. It is noteworthy that, in the present disclosure, the term "primary channel" refers to a 20 MHz channel where medium access through channel contention is allowed. The term "non-primary channel" refers to a 20 MHz channel which is not a primary channel in an operating channel. The term "primary segment" refers to a frequency segment (e.g., an 80 MHz frequency segment) within an operating bandwidth (e.g., 80 MHz, 160 MHz, 80+80 MHz, 240 MHz, 160+80 MHz, 320 MHz or 160+160 MHz) that contains the primary channel. The term "secondary segment" refers to a frequency segment (e.g., an 80 MHz frequency segment) within the operating bandwidth that does not contain the primary channel.

In current bandwidth indication design, the first 7 bits in a Scrambling Sequence are non-zero to ensure that the Scramble Seed is non-zero. In RTS, bits B0~B3 constitute a pseudorandom non-zero integer, bit B4 is used for static or dynamic bandwidth negotiation, and bits B5~B6 are used for bandwidth indication. In CTS, bits B0~B4 constitute a pseudorandom non-zero integer, and bits B5~B6 are used for bandwidth indication. The bandwidth indication may refer to indication of 20 MHz, 40 MHz, 80 MHz, 160 MHz, 80+80 MHz.

Figure 2:
FIG. 2 is a diagram of an example design in accordance with the present disclosure.

FIG. 2 illustrates an example design 200 with respect to bandwidth extension indication without supporting preamble puncturing indication in accordance with an implementation of the present disclosure. In particular, design 200 shows an example design of a control frame (e.g., RTS) and a response frame (e.g., CTS). Referring to FIG. 2, certain bits in a control frame (e.g., RTS), such as bits B3 and B5-B6, may be used to indicate 20 MHz, 40 MHz, 80 MHz, 160 MHz, 80+80 MHz, and bandwidth greater than 160 MHz, such as 240 MHz, 160+80 MHz, 320 MHz and 160+160 MHz, respectively. For instance, when bit B3 is set to 1, bits B5-B6 may be set to a fixed or variable value to indicate the bandwidth as being greater than 160 MHz. Accordingly, bit B3 may be referred to as a "bandwidth extension bit" herein. Some combinations may be reserved. Bit B4 may be used to indicate static or dynamic bandwidth negotiation when the bandwidth is not 20 MHz. When the bandwidth is not 20 MHz, the 3 bits of B0~B2 or the 4 bits of B0~B3 may constitute a pseudorandom non-zero integer for the start of a scrambling sequence. Similarly, as shown in FIG. 2, certain bits in a response frame (e.g., CTS), such as bits B4~B6, in the scrambler sequence may be used to indicate 20 MHz, 40 MHz, 80 MHz, 160 MHz, 80+80 MHz, 240 MHz, 160+80 MHz, 320 MHz and 160+160 MHz, respectively. The other two combinations may be reserved. The 4 bits of B0~B3 may constitute a pseudorandom non-zero integer for the start of a scrambling sequence.

FIG. 3 illustrates an example design 300 with respect to bandwidth extension indication including preamble puncturing in accordance with an implementation of the present disclosure. In particular, design 300 shows an example design of a control frame (e.g., RTS) and a response frame (e.g., CTS). Referring to FIG. 3, certain bits in a control frame (e.g., RTS), such as bits B5~B6 in the first 7 bits of the scrambling sequence, and certain reserved bits, such as bits R0~R3 in the reserved bits of a SERVICE field, may be used to indicate all supported bandwidths with preamble puncturing patterns respectively. For instance, one or more bits (e.g., R0~R3) may be used to indicate bandwidth extension with or without preamble puncturing patterns (e.g., R0 set to 1 and other reserved bits of the SERVICE field set to 0 to indicate the bandwidth 320 MHz, which can also be one of the available bandwidth with preamble puncturing combinations). Similarly, as shown in FIG. 3, certain bits in a response frame (e.g., CTS) may be utilized in the same way as in the control frame for bandwidth indication with preamble puncturing patterns.

Under a proposed scheme in accordance with the present disclosure, there may be several options, described below, that may be utilized to accomplish bandwidth extension signaling indication. Under the proposed scheme, different combinations of medium access control (MAC) address fields in a MAC header of a control frame may be utilized to indicate that the control frame carries extended bandwidth with or without preamble puncturing pattern(s) in the SERVICE field of the control frame. Under a first option (option 1), to indicate that the first 7 scrambled bits or the reserved bits of the SERVICE field are modified by EHT device(s) (e.g., STA 110 and/or STA 120), an EHT initiator (e.g., STA 110 or STA 120) may swap the receiver address (RA) and transmitter address (TA) fields in the control frame (e.g., RTS) carried in a non-high-throughput (non-HT) PPDU sent to an EHT recipient (e.g., STA 120 or STA 110). For instance, the EHT initiator may use the RA field to indicate the MAC address of the transmitter of the control frame. Additionally, the EHT initiator may use the TA field to indicate the MAC address of the receiver of the control frame. Correspondingly, the EHT recipient may match the TA and RA fields of the received control frame with its own MAC address. In an event that the MAC address of the EHT recipient matches the TA field of the received control frame, the EHT recipient may copy the RA field and insert it as the RA of a response frame (e.g., CTS) carried in a non-HT PPDU.

Under a second option (option 2), to indicate that the first 7 scrambled bits or the reserved bits of the SERVICE field are modified by EHT device(s) (e.g., STA 110 and/or STA 120), an EHT initiator (e.g., STA 110 or STA 120) may set the Unicast/Multicast bit to Multicast in the TA and RA fields of a control frame (e.g., RTS) carried in a non-HT PPDU sent to an EHT recipient (e.g., STA 120 or STA 110). For instance, the EHT initiator may set the Unicast/Multicast bit to Multicast in the TA field to indicate the MAC address of the transmitter of the control frame. Moreover, the EHT initiator may set the Unicast/Multicast bit to Multicast in the RA field to indicate the MAC address of the receiver of the control frame. Correspondingly, when the EHT recipient receives the control frame with the Unicast/Multicast bit of the TA and RA fields set to Multicast, respectively, the EHT recipient may change the Unicast/Multicast bit to Unicast before matching the RA field with its own MAC address. In an event that the MAC address of the EHT recipient matches the RA field of the received control frame after changing the Unicast/Multicast bit to Unicast of the RA field, the EHT recipient may copy the TA field and change the Unicast/Multicast bit to Unicast of the TA field before inserting the copied TA field as the RA of a response frame (e.g., CTS) carried in a non-HT PPDU.

Under a third option (option 3), to indicate that the first 7 scrambled bits or the reserved Service bits are modified by EHT device(s) (e.g., STA 110 and/or STA 120), an EHT initiator (e.g., STA 110 or STA 120) may swap the RA and TA fields and, in addition, set the Unicast/Multicast bit to Multicast in the TA field of a control frame (e.g., RTS) carried in a non-HT PPDU sent to an EHT recipient (e.g., STA 120 or STA 110). For instance, the EHT initiator may use the RA field to indicate the MAC address of the transmitter of the control frame. Additionally, the EHT initiator may use the TA field and also set its Unicast/Multicast bit to Multicast to indicate the MAC address of the receiver of the control frame. Correspondingly, the EHT recipient may match the TA field of the received control frame with its own MAC address. Specifically, the EHT recipient may change the Unicast/Multicast bit to Unicast before matching the TA field with its own MAC address. In an event that the MAC address of the EHT recipient matches the TA field of the received control frame, the EHT recipient may copy the RA field and insert it as the RA of a response frame (e.g., CTS) carried in a non-HT PPDU.

Under a fourth option (option 4), to indicate that the first 7 scrambled bits or the reserved bits of the SERVICE field are modified by EHT device(s) (e.g., STA 110 and/or STA 120), an EHT initiator (e.g., STA 110 or STA 120) may swap the RA and TA fields and, in addition, set the Unicast/Multicast bit to Multicast in the TA field of a control frame (e.g., RTS) carried in a non-HT PPDU sent to an EHT recipient (e.g., STA 120 or STA 110). For instance, the EHT initiator may use the RA field and set its Unicast/Multicast bit to Multicast to indicate the MAC address of the transmitter of the control frame. Moreover, the EHT initiator may use the TA field to indicate the MAC address of the receiver of the control frame. Correspondingly, the EHT recipient may match the TA and RA fields of the received control frame with its own MAC address. In an event that the TA field of the received control frame matches the MAC address of the EHT recipient, the EHT recipient may copy the RA field and change the Unicast/Multicast bit to Unicast before inserting it as the RA of a response frame (e.g., CTS) carried in a non-HT PPDU.

Under a proposed scheme in accordance with the present disclosure with respect to bandwidth negotiation without preamble puncturing indication, control frame exchange (e.g., RTS and CTS exchange) may be performed for dynamic bandwidth negotiation without preamble puncturing indication. Under the proposed scheme, bandwidth extension signaling under one of the above-described four options may be combined with bandwidth extension indication using bit B3 in the scrambling sequence of a control frame as described above with respect to design 200. That is, a control frame (e.g., RTS) with bandwidth extension signaling indication (e.g., using one of the above-described four options) may be utilized to indicate negotiated bandwidth without preamble puncturing indication. Accordingly, an existing point coordination function (PCF) inter-frame space (PIFS) medium access scheme may be straightforwardly extended to operations in a 320 MHz bandwidth. For instance, a STA may back off on a primary channel and perform clear channel access (CCA) on one or more secondary channels. In case the medium has been free for a PIFS when a backoff counter reaches zero, the corresponding secondary channel may be considered available and may be used for transmission.

Under the proposed scheme, 3 bits of the scrambling sequence in the control frame (e.g., RTS) may be used to indicate available bandwidth as shown in design 200 based on CCA on the secondary channel(s) at the EHT initiator. Moreover, 1 bit of the scrambling sequence in the control frame (e.g., RTS) may be used to indicate static or dynamic bandwidth negotiation as shown in design 200. The EHT recipient of the control frame with bandwidth signaling indication may match the TA or RA field of the received control frame with its own MAC address based on the bandwidth signaling indication scheme under one of the above-described four options. The EHT recipient may transmit a response on channels that are indicated as available in the received control frame and determined as being free (clear for transmission) at the responder side. In such cases, transmissions in 20 MHz, 40 MHz, 80 MHz, 160 MHz, 80+80 MHz, 240 MHz, 160+80 MHz, 320 MHz and 160+160 MHz may be allowed.

Under a proposed scheme in accordance with the present disclosure with respect to bandwidth negotiation with preamble puncturing, control frame exchange (e.g., RTS and CTS exchange) may be performed for dynamic bandwidth negotiation with preamble puncturing. Under the proposed scheme, bandwidth extension signaling under one of the above-described four options may be combined with bandwidth extension indication and/or preamble puncturing using reserved bits R0~R3 as described above with respect to design 300. That is, a control frame (e.g., RTS) with bandwidth extension signaling indication (e.g., using one of the above-described four options) may be utilized to indicate negotiated bandwidth with preamble puncturing. Accordingly, an existing PIFS medium access scheme may be straightforwardly extended to operations in a 320 MHz bandwidth. For instance, a STA may back off on a primary channel and perform CCA on one or more secondary channels. In case the medium has been free for a PIFS when a backoff counter reaches zero, the corresponding secondary channel may be considered available and may be used for transmission.

Under the proposed scheme, 2 bits of the scrambling sequence and 4 bits of the reserved Service bits in the control frame (e.g., RTS) may be used to indicate available bandwidth with preamble puncturing pattern(s) as shown in design 300 based on CCA on the secondary channel(s) at the EHT initiator. Moreover, 1 bit of the scrambling sequence in the control frame (e.g., RTS) may be used to indicate static or dynamic bandwidth negotiation as shown in design 300. The EHT recipient of the control frame with bandwidth signaling indication may match the TA or RA field of the received control frame with its own MAC address based on the bandwidth signaling indication scheme under one of the above-described four options. The EHT recipient may transmit a response on channels that are indicated as available in the received control frame and determined as being free (clear for transmission) at the responder side. In such cases, preamble puncturing patterns may be allowed.

Under a proposed scheme in accordance with the present disclosure, bandwidth negotiation may be based on preamble puncturing capability. Under the proposed scheme, a non-AP STA may indicate its capability of preamble puncturing support to its associated AP or its peer device (e.g., another non-AP STA). Moreover, an AP capable of preamble puncturing may indicate the bandwidth negotiation with or without preamble puncturing indication by using different options such as one or more of the above-described four options. For instance, the AP may use option 1 described above for bandwidth negotiation without preamble puncturing indication. Similarly, the AP may use option 3 described above for bandwidth negotiation with preamble puncturing indication.

Figure 4:
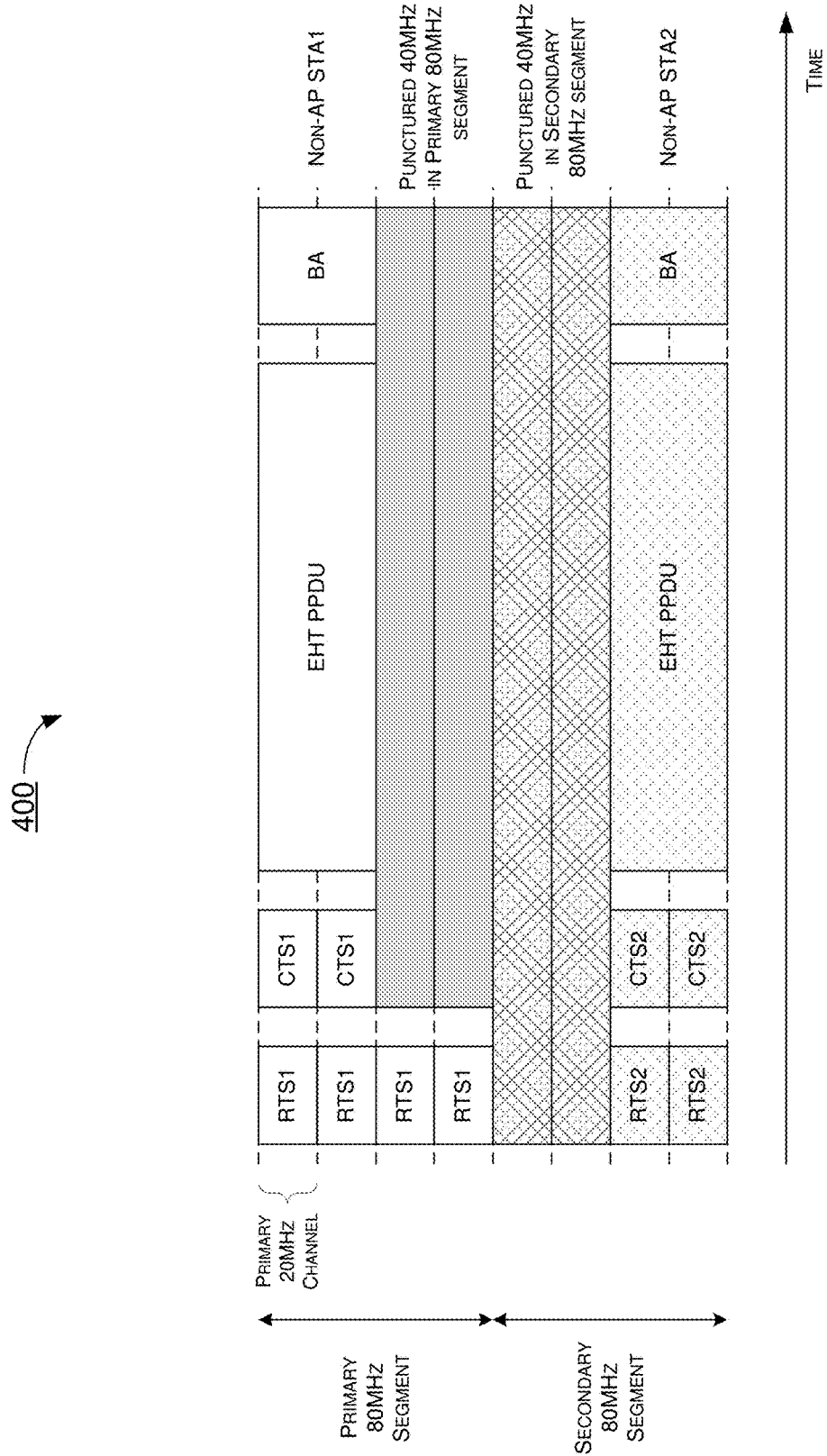
FIG. 4 is a diagram of an example scenario in accordance with the present disclosure.

Under a proposed scheme in accordance with the present disclosure, bandwidth negotiation for multiple users (or multiusers) may be performed. Under the proposed scheme, there may be several options for bandwidth negotiation for multiusers when an AP performs multi-user transmissions on a wide operating bandwidth scheduling transmission for only one user in each 80 MHz frequency segment. For instance, the AP may perform multi-user transmissions in a 160 MHz operating bandwidth with two 80 MHz frequency segments, with one STA operating in a primary 80 MHz frequency segment and another STA operating in a secondary 80 MHz of the 160 MHz operating bandwidth. Under the proposed scheme, a control frame for single user (e.g., RTS) in each frequency segment may be sent so that the control frame may be used to negotiate bandwidth with a corresponding STA parked on the respective 80 MHz frequency segment. FIG. 4 illustrates an example scenario 400 under the proposed scheme. Referring to FIG. 4, a non-HT duplicate first RTS (RTS1) may be sent to a first STA (STA1) in the primary 80 MHz frequency segment, while a non-HT duplicate second RTS (RTS2) may be sent to a second STA (STA2) in the secondary 80 MHz frequency segment.

Figure 5:
FIG. 5 is a diagram of an example design in accordance with the present disclosure.

FIG. 5 illustrates an example design 500 with respect to bandwidth extension indication without supporting preamble puncturing in accordance with an implementation of the present disclosure. In particular, design 500 shows an example design of a control frame (e.g., RTS) and a response frame (e.g., CTS). Referring to FIG. 5, when the MAC address field in the MAC header of the control frame indicates extended bandwidth signaling, bits B5~B6 in the first 6 bits of the scrambling sequence may be used to indicate 240 MHz with primary 160+80, 240 MHz with primary 80+160, and 320 MHz (or 160+160 MHz), respectively. Bit B4 may be used to indicate static or dynamic bandwidth negotiation. The 4 bits of B0~B3 may constitute a pseudorandom non-zero integer for the start of the scrambling sequence. Correspondingly, in a response frame with an extended bandwidth signaling, bits B4~B6 in the first 7 bits of the scrambler sequence may be used to indicate 20 MHz, 40 MHz, 80 MHz, 160 MHz, 80+80 MHz, 240 MHz, 160+80 MHz, 320 MHz and 160+160 MHz, respectively. The 4 bits of B0~B3 may constitute a pseudorandom non-zero integer for the start of the scrambling sequence.

Under a proposed scheme in accordance with the present disclosure, there may be several options, described below, that may be utilized to accomplish bandwidth extension signaling. Under the proposed scheme, different combinations of MAC address fields in a MAC header of a control frame may be utilized to indicate that the control frame carries extended bandwidth. Under a first option (option 1), to indicate bandwidth extension signaling, an EHT initiator (e.g., STA 110 or STA 120) may swap the RA and TA fields in the control frame (e.g., RTS) carried in a non-HT PPDU sent to an EHT recipient (e.g., STA 120 or STA 110). For instance, the EHT initiator may use the RA field to indicate the MAC address of the transmitter of the control frame. Additionally, the EHT initiator may use the TA field to indicate the MAC address of the receiver of the control frame. Correspondingly, the EHT recipient may match the TA and RA fields of the received control frame with its own MAC address. In an event that the MAC address of the EHT recipient matches the TA field of the received control frame, the EHT recipient may copy the RA field and insert it as the RA of a response frame (e.g., CTS) carried in a non-HT PPDU. Moreover, the EHT recipient may use bits B4~B6 in the first 7 bits of the scrambling sequence to indicate the bandwidth in the response frame.

Under a second option (option 2), to indicate bandwidth extension signaling, an EHT initiator (e.g., STA 110 or STA 120) may set the Individual/Group bit to Group in the TA and RA fields of a control frame (e.g., RTS) carried in a non-HT PPDU sent to an EHT recipient (e.g., STA 120 or STA 110). For instance, the EHT initiator may set the Individual/Group bit to Group in the TA field to indicate the MAC address of the transmitter of the control frame. Moreover, the EHT initiator may set the Individual/Group bit to Group in the RA field to indicate the MAC address of the receiver of the control frame. Correspondingly, when the EHT recipient receives the control frame with the extended bandwidth signaling, the EHT recipient may change the Individual/Group bit to Individual before matching the RA field with its own MAC address. In an event that the MAC address of the EHT recipient matches the modified RA field of the received control frame, the EHT recipient may copy the TA field and change the Individual/Group bit to Individual before inserting the copied TA field as the RA of a response frame (e.g., CTS) carried in a non-HT PPDU. Moreover, the EHT recipient may use bits B4-B6 in the first 7 bits of the scrambling sequence to indicate the bandwidth in the response frame.

Under a third option (option 3), to indicate extended bandwidth signaling, an EHT initiator (e.g., STA 110 or STA 120) may swap the RA and TA fields and, in addition, set the Individual/Group bit to Group in the TA field of a control frame (e.g., RTS) carried in a non-HT PPDU sent to an EHT recipient (e.g., STA 120 or STA 110). For instance, the EHT initiator may use the RA field to indicate the MAC address of the transmitter of the control frame. Additionally, the EHT initiator may use the TA field and also set its Individual/Group bit to Group to indicate the MAC address of the receiver of the control frame. Correspondingly, the EHT recipient may match the TA field of the received control frame with its own MAC address. Specifically, the EHT recipient may change the Individual/Group bit to Individual before matching the TA field with its own MAC address. In an event that the MAC address of the EHT recipient matches the TA field of the received control frame, the EHT recipient may copy the RA field and insert it as the RA of a response frame (e.g., CTS) carried in a non-HT PPDU. Moreover, the EHT recipient may use bits B4~B6 in the first 7 bits of the scrambling sequence to indicate the bandwidth in the response frame.

Under a fourth option (option 4), to indicate extended bandwidth signaling, an EHT initiator (e.g., STA 110 or STA 120) may swap the RA and TA fields and, in addition, set the Individual/Group bit to Group in the RA field of a control frame (e.g., RTS) carried in a non-HT PPDU sent to an EHT recipient (e.g., STA 120 or STA 110). For instance, the EHT initiator may use the RA field and set its Individual/Group bit to Group to indicate the MAC address of the transmitter of the control frame. Moreover, the EHT initiator may use the TA field to indicate the MAC address of the receiver of the control frame. Correspondingly, the EHT recipient may match the TA and RA fields of the received control frame with its own MAC address. In an event that the TA field of the received control frame matches the MAC address of the EHT recipient, the EHT recipient may copy the RA field and change the Individual/Group bit to Individual before inserting it as the RA of a response frame (e.g., CTS) carried in a non-HT PPDU. Moreover, the EHT recipient may use bits B4~B6 in the first 7 bits of the scrambling sequence to indicate the bandwidth in the response frame.

Under a fifth option (option 5), to indicate extended bandwidth signaling, an EHT initiator (e.g., STA 110 or STA 120) may swap the RA and TA fields and, in addition, set the Individual/Group bit to Group in the TA and RA fields of a control frame (e.g., RTS) carried in a non-HT PPDU sent to an EHT recipient (e.g., STA 120 or STA 110). For instance, the EHT initiator may use the RA field and set its Individual/Group bit to Group to indicate the MAC address of the transmitter of the control frame. Moreover, the EHT initiator may use the TA field and set its Individual/Group bit to Group to indicate the MAC address of the receiver of the control frame. Correspondingly, the EHT recipient may match the TA and RA fields of the received control frame with its own MAC address. The EHT recipient may change the Individual/Group bit of each of TA and RA fields to Individual. In an event that the TA field of the received control frame matches the MAC address of the EHT recipient, the EHT recipient may copy the RA field and change the Individual/Group bit to Individual before inserting it as the RA of a response frame (e.g., CTS) carried in a non-HT PPDU. Moreover, the EHT recipient may use bits B4~B6 in the first 7 bits of the scrambling sequence to indicate the bandwidth in the response frame.

Under a proposed scheme in accordance with the present disclosure, bandwidth indication and negotiation may be performed with a trigger frame. Under the proposed scheme, a trigger frame such as a multi-user RTS (MU-RTS) may be reused to indicate and negotiate bandwidth with or without preamble puncturing to a single STA in a wide operating bandwidth (e.g., 80 MHz, 160 MHz, 80+80 MHz, 240 MHz, 160+80 MHz, 320 MHz or 160+160 MHz). For instance, the TA field of the MU-RTUS may be a signaling TA to indicate bandwidth indication and negotiation, where the signaling TA may be used to set the Individual/Group bit to Group in the MAC address of the transmitter (e.g., using one of the above-described five options as signaling for bandwidth indication and negotiation). Alternatively, one bit in the Common Info field of the MU-RTS may be used for signaling of bandwidth indication and negotiation to the STA. Alternatively, one or more bits in the User Info field of the MU-RTS may be used for signaling of bandwidth indication and negotiation to the STA. As an example, the MU-RTS may carrier User Info field to indicate allocated RU(s), and a RU Allocation subfield may be used to indicate a puncturing pattern (e.g., 6 bits used to indicate bandwidth with puncturing pattern). That is, bit B0 of the RU Allocation subfield may be used to indicate static/dynamic bandwidth negotiation, bit B1 of the RU Allocation subfield may be reserved, and bits B7-B2 of the RU Allocation subfield may be set to indicate a preamble puncturing pattern.

Figure 6:
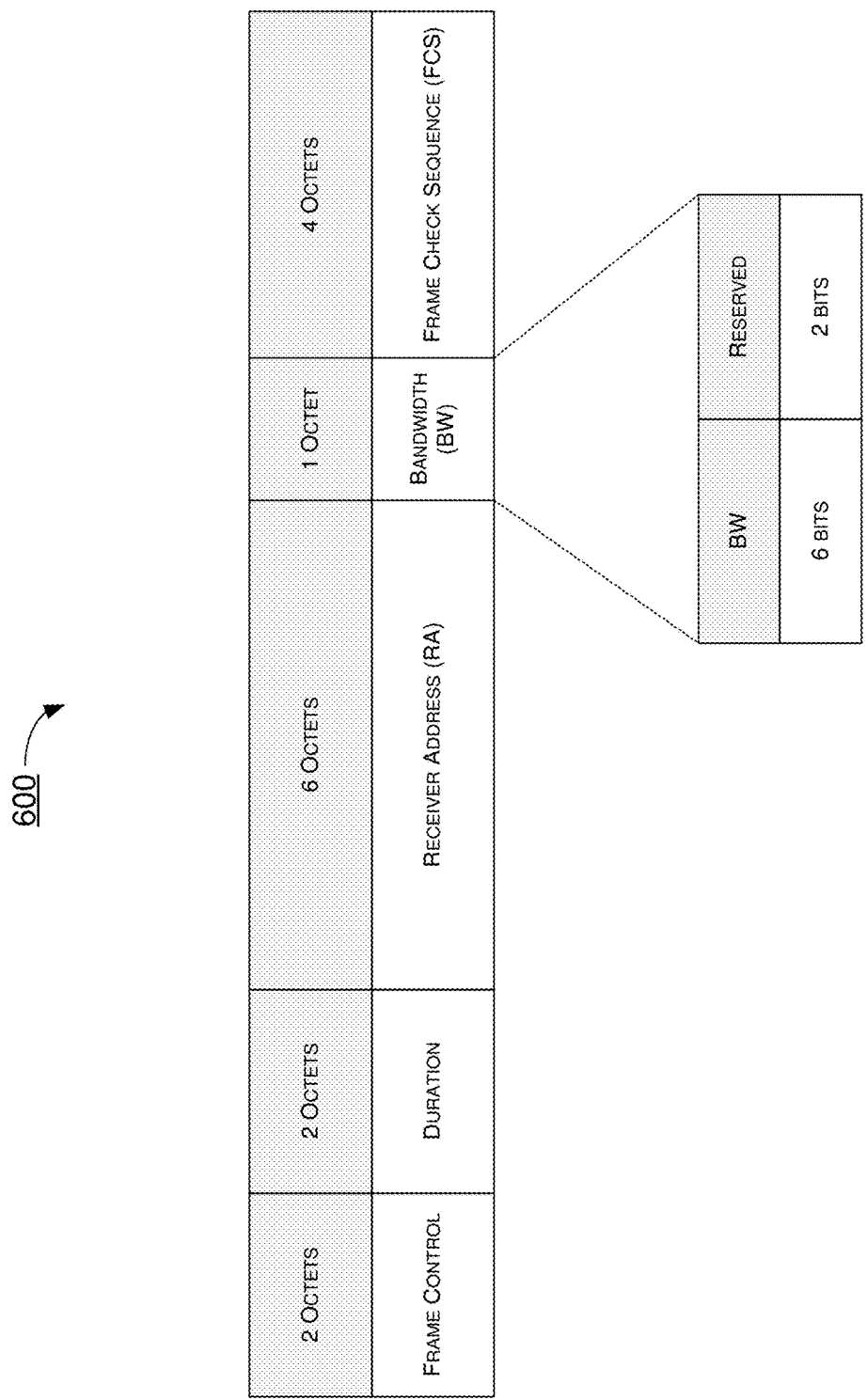
FIG. 6 is a diagram of an example design in accordance with the present disclosure.

Under the proposed scheme, the MU-RTS may be carried in a non-HT PPDU or a non-HT duplicate PPDU. The MU-RTS in a downlink (DL) transmission may set the RA to the MAC address of an intended STA. The MU-RTS in an uplink (UL) transmission may set the RA to the MAC address of an AP. The intended recipient may respond with an EHT-CTS for the MU-RTS with bandwidth indication and negotiation signaling. FIG. 6 illustrates an example design 600 of dynamic bandwidth negotiation under dynamic preamble puncturing in an implementation under the proposed scheme. Referring to FIG. 6, an EHT-CTS frame format may built upon legacy CTS by adding a bandwidth field (BW) with a length of one octet. The BW field may include 6 bits of a BW subfield and 2 reserved bits. The BW subfield may indicate a bandwidth including a preamble puncturing pattern.

Figure 7:
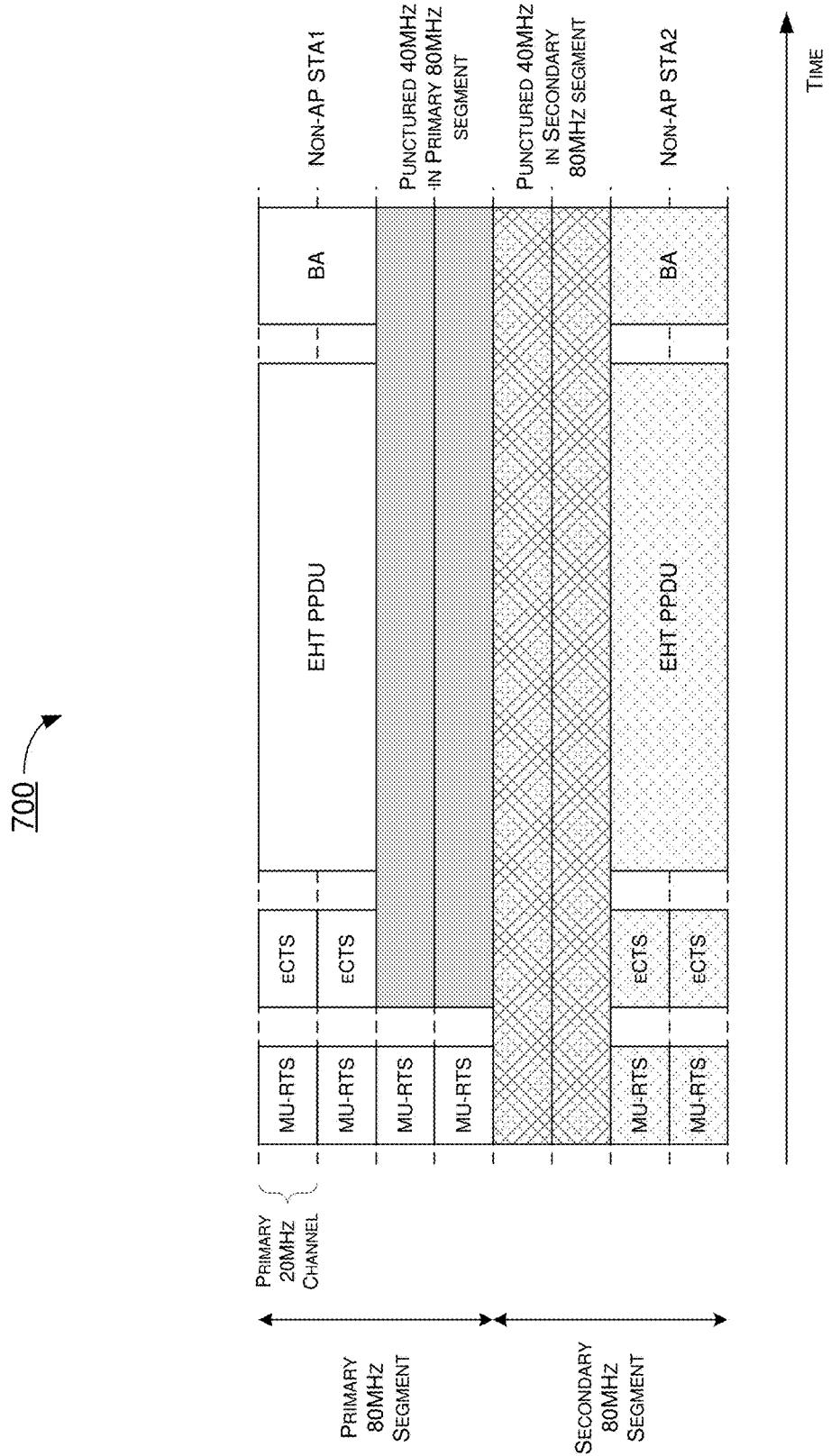
FIG. 7 is a diagram of an example scenario in accordance with the present disclosure.

Under a proposed scheme in accordance with the present disclosure, bandwidth negotiation for multiple users (or multiusers) may be performed. Under the proposed scheme, when dynamic preamble puncturing for multiusers is supported, MU-RTS may be used for a single user in each frequency segment (e.g., 80 MHz frequency segment). For instance, an AP may transmit a non-HT duplicate MU-RTS to a first STA (STA1) and a second STA (STA2). The RU Allocation subfield for each STA may indicate a preamble puncturing pattern. The MU-RTS may be duplicated on all frequency segments carrying the User Info field for each STA with a preamble puncturing indication. Alternatively, the MU-RTS on each frequency segment for a single STA may carry the User Info field only for the corresponding STA with a preamble puncturing indication. Each of STA1 and STA2 may send a CTS or EHT-CTS on one or more available 20 MHz channels with the preamble puncturing indication. It is noteworthy that the RU allocations for STA1 and STA2 may not be overlapped. FIG. 7 illustrates an example scenario 700 under the proposed scheme. Referring to FIG. 7, a non-HT duplicate MU-RTS may be sent to STA1 in a primary 20 MHz channel in the primary 80 MHz frequency segment, while another non-HT duplicate MU-RTS may be sent to STA2 in in a primary 20 MHz channel in the secondary 80 MHz frequency segment. In scenario 700, upon receiving the MU-RTS, each of STA1 and STA2 may respectively respond with an extended CTS (denoted as "eCTS" in FIG. 7) with a format as design 600 described above with respect to FIG. 6. For each of STA1 and STA 2, after the exchange of MU-RTS and eCTS, one or more EHT PPDUs may be transmitted/received followed by a block acknowledgement (BA). For each of STA1 and STA 2, transmissions of eCTS, EHT PPDU(s) and BA may be performed in the negotiated bandwidth (e.g., 40 MHz in scenario 700) although, for STA1, the available/supported bandwidth as indicated in the MU-RTS might be larger (e.g., 80 MHz).

FIG. 8 illustrates an example design 800 with respect to EHT bandwidth signaling in accordance with an implementation of the present disclosure. In design 800, a reserved bit B7 in the SERVICE field of an EHT control frame may be utilized to indicate extended channel bandwidth. For instance, bit B7 may be set to 1 to indicate extended channel bandwidth (e.g., 320 MHz) and 0 to indicate otherwise. Moreover, bits B5-B6 in the first 7 bits of the scrambling sequence may be utilized to indicate channel bandwidth indication. For instance, when bit B7 is set to 1, bits B5~B6 may be set to a fixed value (e.g., "11" to represent a combined bandwidth of 160 MHz or 80+80 MHz to legacy STAs). Alternatively, when bit B7 is set to 1, bits B5~B6 may be dynamically set to "00", "01", "10" or "11" representing 20 MHz, 40 MHz, 80 MHz, 160/80+80 MHz to legacy STAs based on the static preamble puncturing. Otherwise, when bit B7 is set to 0, bits B5-B6 may be set to "00", "01", "10" or "11" representing 20 MHz, 40 MHz, 80 MHz, 160/80+80 MHz. Under the proposed scheme, bit B4 in the first 7 bits of the scrambling sequence may be used to indicate static or dynamic bandwidth indication.

FIG. 9 illustrates an example design 900 with respect to EHT-RTS 320 MHz bandwidth signaling in accordance with an implementation of the present disclosure. In design 900, a reserved bit B7 in the SERVICE field of an EHT-RTS may be utilized to indicate extended channel bandwidth. For instance, bit B7 may be set to 1 to indicate extended channel bandwidth of 320 MHz. Moreover, bits B5~B6 in the first 7 bits of the scrambling sequence may be utilized to indicate channel bandwidth indication. For instance, bits B5~B6 may be set to a fixed value (e.g., "11" to represent a combined bandwidth of 160 MHz or 80+80 MHz to legacy STAs). Alternatively, bits B5~B6 may be dynamically set to "00", "01", "10" or "11" representing 20 MHz, 40 MHz, 80 MHz, 160/80+80 MHz to legacy STAs based on the static preamble puncturing. Under the proposed scheme, bit B4 in the first 7 bits of the scrambling sequence may be used to indicate static or dynamic bandwidth indication, and bits B0~B3 for the scrambling sequence, ScramblingSequence-Start4, may be randomly chosen from the values of 1~15.

FIG. 10 illustrates an example design 1000 with respect to EHT-CTS 320 MHz bandwidth signaling in accordance with an implementation of the present disclosure. In design 1000, a reserved bit B7 in the SERVICE field of an EHT-CTS may be utilized to indicate extended channel bandwidth. For instance, bit B7 may be set to 1 to indicate extended channel bandwidth of 320 MHz. Moreover, bits B5~B6 in the first 7 bits of the scrambling sequence may be utilized to indicate channel bandwidth indication. For instance, bits B5~B6 may be set to a fixed value (e.g., "11" representing a combined bandwidth of 160 MHz or 80+80 MHz to legacy STAs or "10" representing combined bandwidth of 80 MHz to legacy STAs). Alternatively, bits B5~B6 may be dynamically set to "00", "01", "10" or "11" representing 20 MHz, 40 MHz, 80 MHz, 160/80+80 MHz to legacy STAs based on the static preamble puncturing. Under the proposed scheme, bits B0~B4 for the scrambling sequence, ScramblingSequence-Start5, may be randomly chosen from the values of 1~15. Under the proposed scheme, the baseline signaling TA may also be applied. For instance, the TA field in the MAC header may be set to that of the bandwidth signaling TA.

Figure 11:
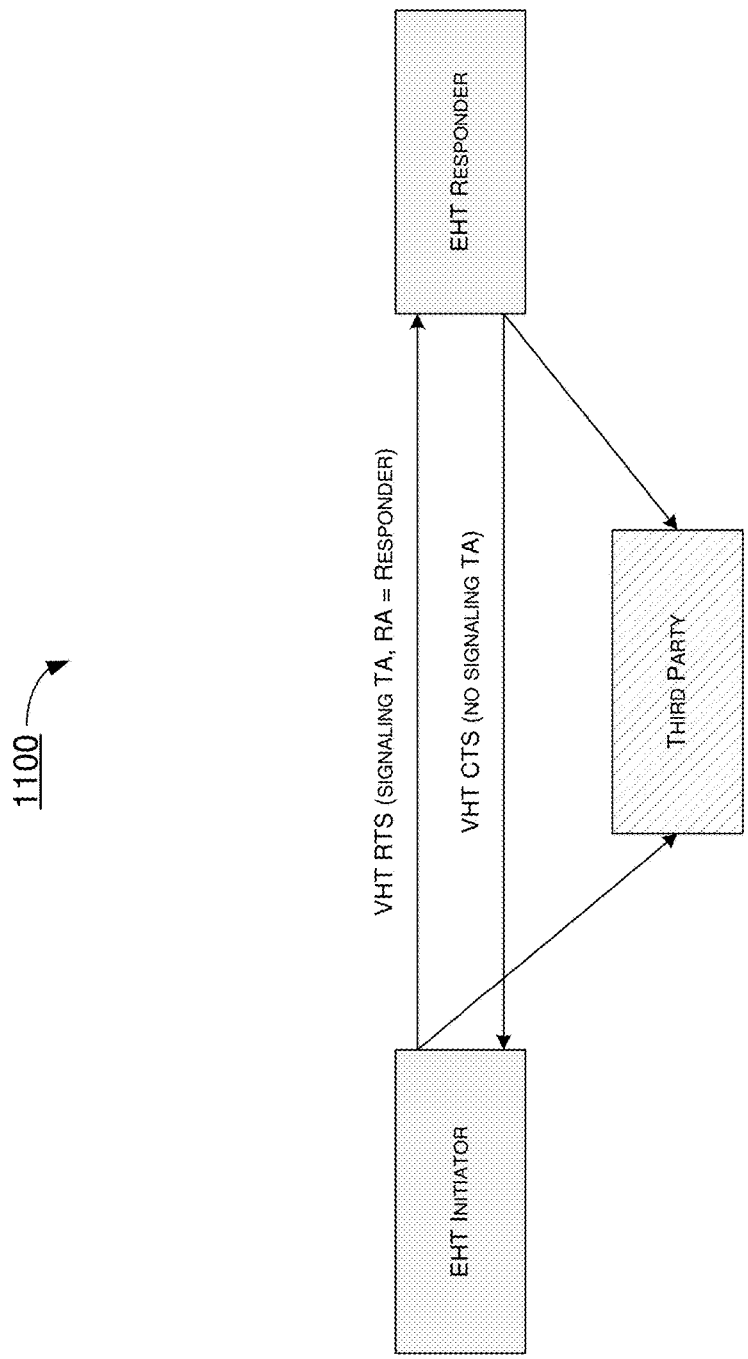
FIG. 11 is a diagram of an example scenario in accordance with the present disclosure.

FIG. 11 illustrates an example scenario 1100 with respect to EHT RTS and EHT CTS for bandwidth indication and negotiation in accordance with an implementation of the present disclosure. Under a proposed scheme, when an EHT initiator transmits a 20 MHz, 40 MHz, 80 MHz, 160 MHz or 80+80 MHz RTS frame, the EHT initiator may use a very-high-throughput (VHT) RTS frame with baseline bandwidth signaling TA. In such cases, an EHT responder may use a VHT CTS frame to perform static or dynamic bandwidth negotiation and indication. It is noteworthy that, when the operating bandwidth is less than or equal to 160 MHz, the procedure may be the same as a legacy procedure for VHT RTS/CTS. Moreover, the VHT RTS frame and VHT CTS frame may also be transmitted to one or more other STAs (shown as "third party" in FIG. 11).

Figure 12:
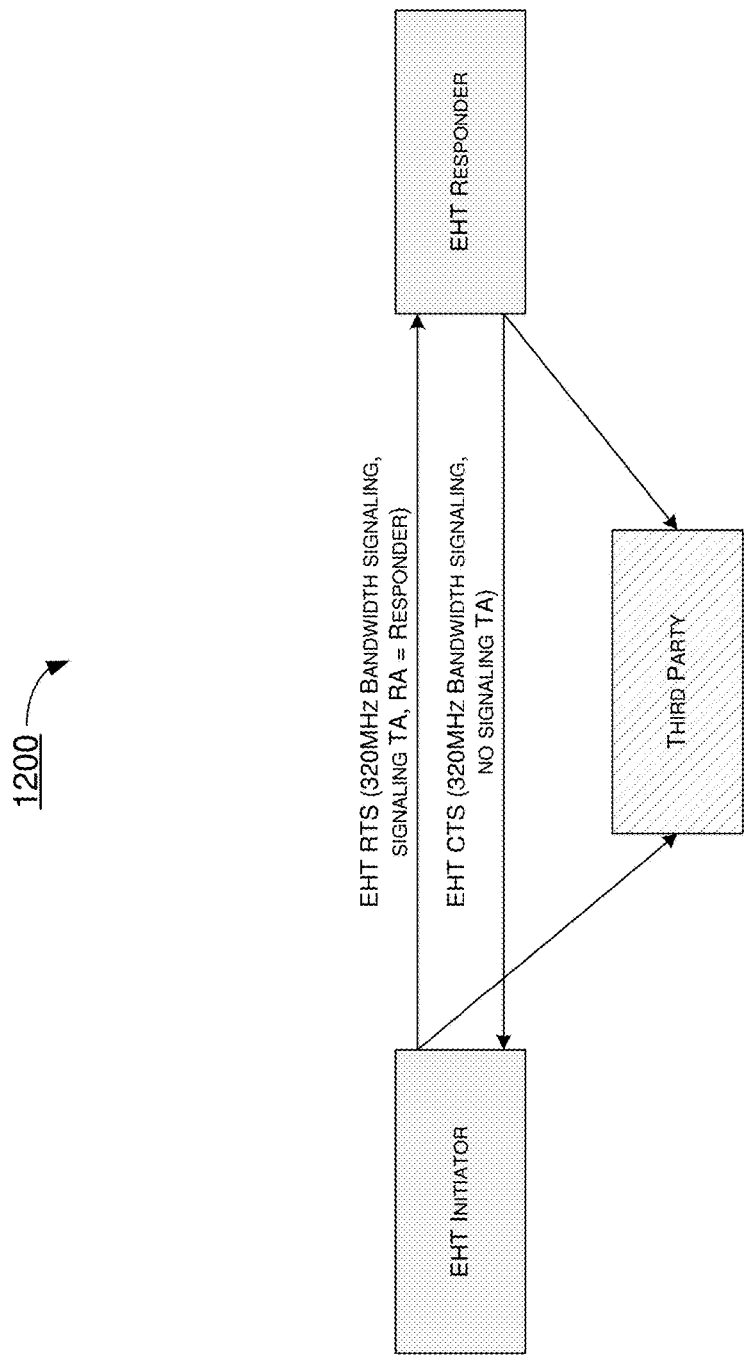
FIG. 12 is a diagram of an example scenario in accordance with the present disclosure.

FIG. 12 illustrates an example scenario 1200 with respect to EHT RTS and EHT CTS for bandwidth indication and negotiation in accordance with an implementation of the present disclosure. Under a proposed scheme, when an EHT initiator transmits a 320 MHz RTS frame, the EHT initiator may use an EHT RTS frame with 320 MHz bandwidth signaling (and with bit B7 in the SERVICE field set to 1). The baseline bandwidth signaling TA may also be applied. Moreover, when the EHT RTS indicates static bandwidth negotiation, in case the response in non-HT duplicate PPDU is of the bandwidth 320 MHz, the EHT responder may use an EHT CTS frame with 320 MHz bandwidth signaling. Otherwise, the EHT responder may not respond. It is noteworthy that, when the operating bandwidth is equal to 320 MHz or greater than 160 MHz, and in case static bandwidth negotiation is indicated, EHT RTS and EHT CTS may be utilized. Moreover, the EHT RTS frame and EHT CTS frame may also be transmitted to one or more other STAs (shown as "third party" in FIG. 12).

Figure 13:
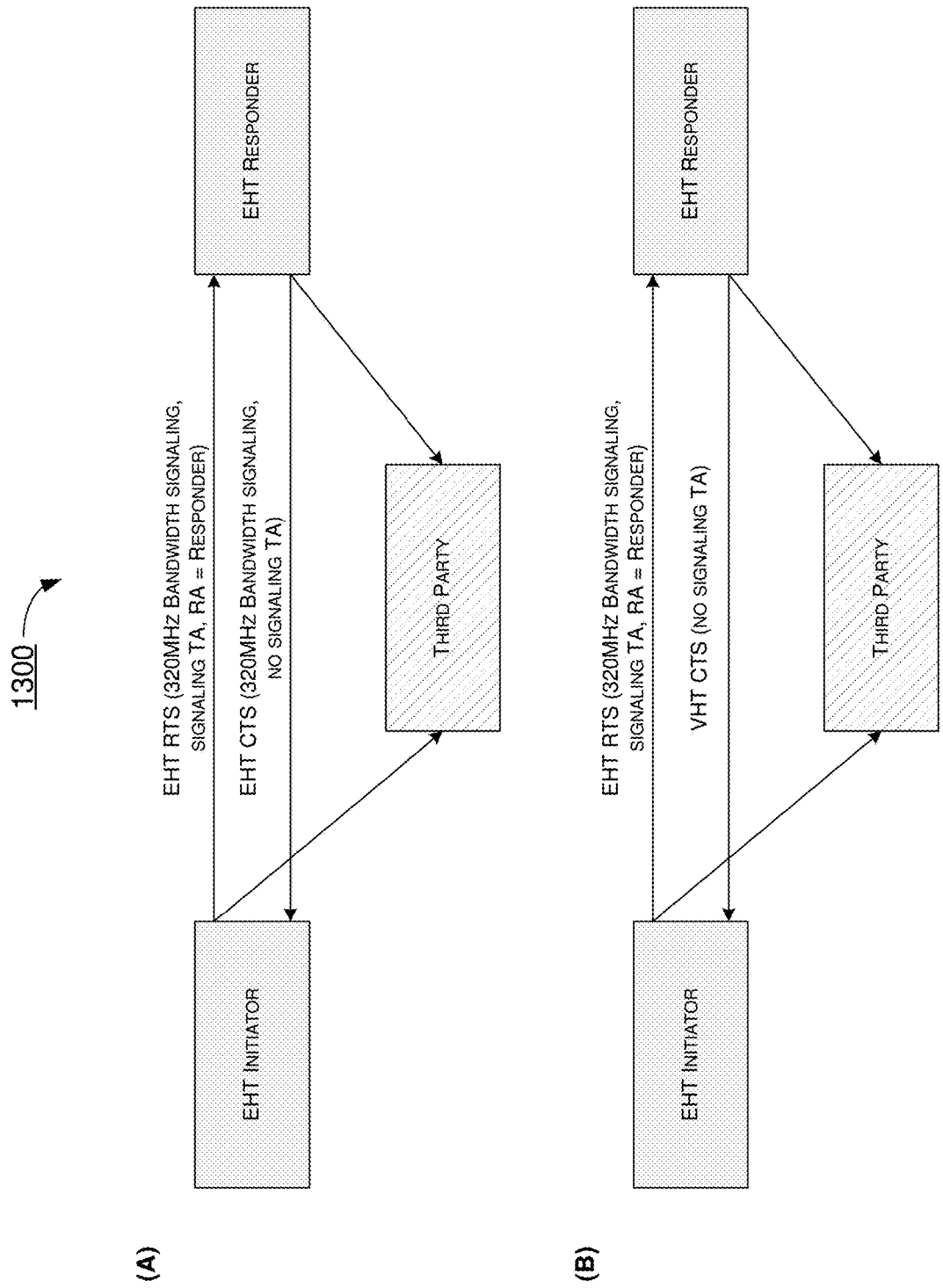
FIG. 13 is a diagram of an example scenario in accordance with the present disclosure.

FIG. 13 illustrates an example scenario 1300 with respect to EHT RTS and EHT CTS for bandwidth indication and negotiation in accordance with an implementation of the present disclosure. Under a proposed scheme, when an EHT initiator transmits a 320 MHz RTS frame, the EHT initiator may use an EHT RTS frame with 320 MHz bandwidth signaling (and with bit B7 in the SERVICE field set to 1). The baseline bandwidth signaling TA may also be applied. Moreover, when the EHT RTS indicates dynamic bandwidth negotiation, in case the response in non-HT duplicate PPDU is of the bandwidth 320 MHz, the EHT responder may use an EHT CTS frame with 320 MHz bandwidth signaling, as shown in part (A) of FIG. 13. Otherwise, in case the response in non-HT duplicate PPDU has a bandwidth less than 320 MHz, the EHT responder may use a VHT CTS frame, as shown in part (B) of FIG. 13. It is noteworthy that, when the operating bandwidth is equal to 320 MHz and dynamic bandwidth negotiation is indicated, then EHT RTS and EHT CTS may be utilized in case response bandwidth is 320 MHz. Otherwise, in case response bandwidth is less than 320 MHz, EHT RTS and VHT CTS may be utilized. Moreover, the EHT RTS frame and EHT CTS frame/VHT CTS frame may also be transmitted to one or more other STAs (shown as "third party" in FIG. 13).

Under a proposed scheme in accordance with the present disclosure, when an EHT initiator transmits a 320 MHz control frame without bandwidth negotiation (e.g., BAR, PS-Poll, NDPA, CTS, CF-END and the like), the EHT initiator may use an EHT frame with 320 MH bandwidth signaling (with bit B7 in the SERVICE field set to 1). The baseline signaling TA may also be applied. For instance, the TA field in the MAC header may be set to that of the bandwidth signaling TA.

Illustrative Implementations

Figure 14:
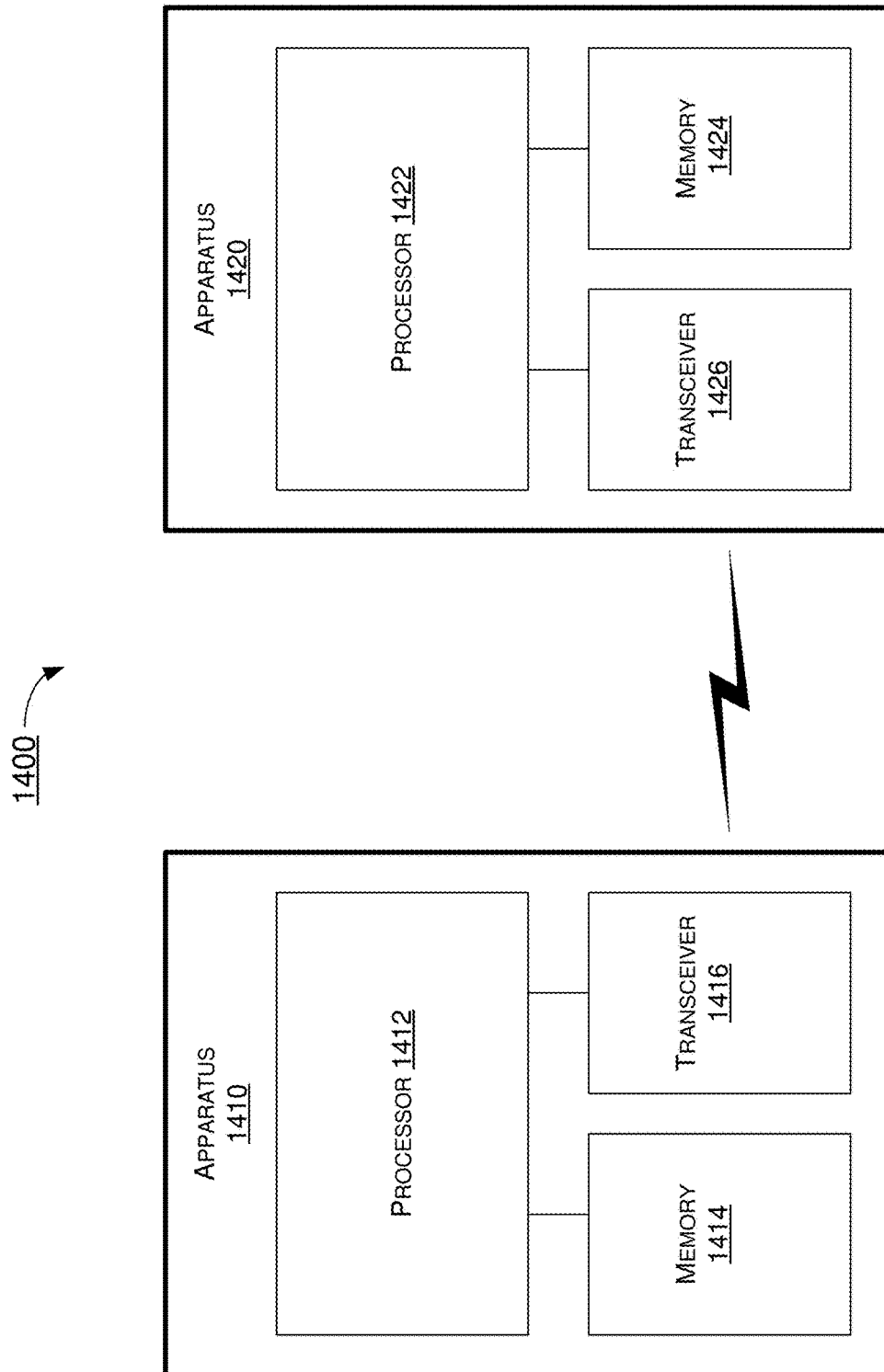
FIG. 14 is a block diagram of an example communication system in accordance with an implementation of the present disclosure.

FIG. 14 illustrates an example system 1400 having at least an example apparatus 1410 and an example apparatus 1420 in accordance with an implementation of the present disclosure. Each of apparatus 1410 and apparatus 1420 may perform various functions to implement schemes, techniques, processes and methods described herein pertaining to bandwidth extension indication and negotiation in wireless communications, including the various schemes described above with respect to various proposed designs, concepts, schemes, systems and methods described above as well as processes described below. For instance, apparatus 1410 may be implemented in STA 110 and apparatus 1420 may be implemented in STA 120, or vice versa.

Each of apparatus 1410 and apparatus 1420 may be a part of an electronic apparatus, which may be a non-AP STA or an AP STA, such as a portable or mobile apparatus, a wearable apparatus, a wireless communication apparatus or a computing apparatus. When implemented in a non-AP STA, each of apparatus 1410 and apparatus 1420 may be implemented in a smartphone, a smart watch, a personal digital assistant, a digital camera, or a computing equipment such as a tablet computer, a laptop computer or a notebook computer. Each of apparatus 1410 and apparatus 1420 may also be a part of a machine type apparatus, which may be an IoT apparatus such as an immobile or a stationary apparatus, a home apparatus, a wire communication apparatus or a computing apparatus. For instance, each of apparatus 1410 and apparatus 1420 may be implemented in a smart thermostat, a smart fridge, a smart door lock, a wireless speaker or a home control center. When implemented in or as a network apparatus, apparatus 1410 and/or apparatus 1420 may be implemented in a network node, such as an AP in a WLAN.

In some implementations, each of apparatus 1410 and apparatus 1420 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1410 and apparatus 1420 may be implemented in or as a non-AP STA or an AP STA. Each of apparatus 1410 and apparatus 1420 may include at least some of those components shown in FIG. 5 such as a processor 1412 and a processor 1422, respectively, for example. Each of apparatus 1410 and apparatus 1420 may further include one or more other components not pertinent to the proposed scheme of the present disclosure (e.g., internal power supply, display device and/or user interface device), and, thus, such component(s) of apparatus 1410 and apparatus 1420 are neither shown in FIG. 5 nor described below in the interest of simplicity and brevity.

In one aspect, processor 1412 and processor 1422 may be implemented in the form of one or more single-core processors, one or more multi-core processors, one or more RISC processors or one or more CISC processors. That is, even though a singular term "a processor" is used herein to refer to processor 1412 and processor 1422, processor 1412 and processor 1422 may include multiple processors in some implementations and a single processor in other implementations in accordance with the present disclosure. In another aspect, processor 1412 and processor 1422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 1412 and processor 1422 is a special-purpose machine specifically designed, arranged and configured to perform specific tasks including those pertaining to bandwidth extension indication and negotiation in wireless communications in accordance with various implementations of the present disclosure.

In some implementations, apparatus 1410 may also include a transceiver 1416 coupled to processor 1412. Transceiver 1416 may include a transmitter capable of wirelessly transmitting and a receiver capable of wirelessly receiving data. In some implementations, apparatus 1420 may also include a transceiver 1426 coupled to processor 1422. Transceiver 1426 may include a transmitter capable of wirelessly transmitting and a receiver capable of wirelessly receiving data.

In some implementations, apparatus 1410 may further include a memory 1414 coupled to processor 1412 and capable of being accessed by processor 1412 and storing data therein. In some implementations, apparatus 1420 may further include a memory 1424 coupled to processor 1422 and capable of being accessed by processor 1422 and storing data therein. Each of memory 1414 and memory 1424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1414 and memory 1424 may include a type of read-only memory (ROM) such as mask ROM, programmable ROM (PROM), erasable programmable ROM (EPROM) and/or electrically erasable programmable ROM (EEPROM). Alternatively, or additionally, each of memory 1414 and memory 1424 may include a type of non-volatile random-access memory (NVRAM) such as flash memory, solid-state memory, ferroelectric RAM (FeRAM), magnetoresistive RAM (MRAM) and/or phase-change memory.

Each of apparatus 1410 and apparatus 1420 may be a communication entity capable of communicating with each other using various proposed schemes in accordance with the present disclosure. For illustrative purposes and without limitation, a description of capabilities of apparatus 1410, as STA 110 (e.g., an AP STA), and apparatus 1420, as STA 120 (e.g., a non-AP STA), is provided below. It is noteworthy that, although the example implementations described below are provided in the context of WLAN, the same may be implemented in other types of networks. It is also noteworthy that, although examples described below are provide in the context of apparatus 1410, the examples may also be applicable to apparatus 1420 or otherwise implemented by apparatus 1420.

Under a proposed scheme pertaining to bandwidth extension indication and negotiation in wireless communications in accordance with the present disclosure, with apparatus 1410 implemented in or as STA 110 and apparatus 1420 implemented in or as STA 120 in network environment 100 in accordance with one or more of IEEE 802.11 standards, processor 1412 of apparatus 1410 and processor 1422 of apparatus 1420 may perform (via transceiver 1416 and transceiver 1426, respectively) bandwidth negotiation between STA 110 and STA 120 with a bandwidth extension indication. Additionally, processor 1412 and processor 1422 may wirelessly communicate (via transceiver 1416 and transceiver 1426, respectively) with each other according to the bandwidth negotiation.

In some implementations, in performing the bandwidth negotiation, processor 1412 and processor 1422 may perform the bandwidth negotiation with no preamble puncturing indication by transmitting or receiving a control frame (e.g., RTS) with one bandwidth extension bit in a SERVICE field of the control frame indicating bandwidth extension.

In some implementations, the one bandwidth extension bit may include either a bit (e.g., B3) of first 7 bits of a scrambling sequence carried in the SERVICE field of the control frame or a reserved bit (e.g., B7) in the SERVICE field. In such cases, the bit B3 may be set to either 0 to indicate an operating bandwidth being less than or equal to 160 MHz or 1 to indicate the operating bandwidth being greater than 160 MHz. For instance, two or more bits (e.g., bits B5~B6) of the first 7 bits of the scrambling sequence carried in the SERVICE field of the control frame may indicate an available bandwidth being 20 MHz, 40 MHz, 80 MHz, 160 MHz, 80+80 MHz when the bandwidth extension bit is set to 0. The two or more bits (e.g., bits B5~B6) of the first 7 bits of the scrambling sequence carried in the SERVICE field of the control frame may be set to a fixed or variable value to indicate an available bandwidth being 320 MHz when the bandwidth extension bit is set to 1.

In some implementations, in performing the bandwidth negotiation, processor 1412 and processor 1422 may perform the bandwidth negotiation with no preamble puncturing indication by (e.g., when an initiating frame is an EHT frame) receiving or transmitting a response frame (e.g., CTS) with one bandwidth extension bit in a SERVICE field of the response frame indicating an available bandwidth being greater than 160 MHz (e.g., when the available bandwidth is 320 MHz) when set to 1. For instance, bit B3 may be used to indicate transmission bandwidth being greater than 160 MHz. When bandwidth is greater than 160 MHz, bit B3 may be set to 1, and bit B5~B6 may be set to a fixed or variable value. Otherwise, bit B3 may be set to 0 and bits B5~B6 may indicate bandwidth 20 MHz, 40 MHz, 80 MHz, or 160/80+80 MHz.

In some implementations, the bandwidth extension bit of the response frame may be in first 7 bits of a scrambling sequence carried in the SERVICE field or in reserved bits of the SERVICE field.

In some implementations, in performing the bandwidth negotiation, processor 1412 and processor 1422 may perform the bandwidth negotiation with preamble puncturing indication (e.g., indicating preamble puncturing patterns) by transmitting or receiving a control frame (e.g., RTS) or a response frame (e.g., CTS) with at least one or more bits in a SERVICE field of the control frame or the response frame indicating an available bandwidth with a preamble puncturing indication. In such cases, two or more bits (e.g., bits B5~B6) in first 7 bits of a scrambling sequence carried in the SERVICE field and a plurality of reserved service bits in the SERVICE field (e.g., bits R0~R3) may indicate the available bandwidth with the preamble puncturing indication.

In some implementations, in performing the bandwidth negotiation, processor 1412 and processor 1422 may perform the bandwidth negotiation between STA 110 and STA 120 as an EHT initiator and an EHT responder, respectively, by performing certain operations. For instance, processor 1412 of apparatus 1410, as the EHT initiator, may transmit a control frame (e.g., RTS) to the EHT responder, such that: (a) a RA field of the control frame indicates an address of a transmitter of the control frame, and (b) a TA field of the control frame indicates an address of a receiver of the control frame. Moreover, processor 1422 of apparatus 1420, as the EHT responder, may receive the control frame and match the RA field and the TA field of the control frame with an address of the EHT responder. In response to the TA field of the control frame matching the address of the EHT responder, processor 1422 may perform certain operations. For instance, processor 1422 may copy and insert the RA field of the control frame in a RA field of a response frame (e.g., CTS) carried in a non-HT PPDU. Additionally, processor 1422 may transmit the non-HT PPDU to the EHT initiator. In some implementations, first 7 bits of a scrambling sequence or one or more reserved service bits in the control frame may be modified by the EHT initiator.

In some implementations, in performing the bandwidth negotiation, processor 1412 and processor 1422 may perform the bandwidth negotiation between STA 110 and STA 120 as an EHT initiator and an EHT responder, respectively, by performing certain operations. For instance, processor 1412 of apparatus 1410, as the EHT initiator, may transmit a control frame (e.g., RTS) to the EHT responder with signaling in a MAC header indicating either or both of first 7 bits of a scrambling sequence carried in a SERVICE field in the control frame and one or more reserved bits in the SERVICE field carrying at least bandwidth extension without preamble puncturing indication or bandwidth extension with preamble puncturing indication. In such cases: (a) a TA field of the control frame may indicate an address of a transmitter of the control frame, with a Unicast/Multicast bit in the TA field set to Multicast, and (b) a RA field of the control frame may indicate an address of a receiver of the control frame, with a Unicast/Multicast bit in the RA field set to Multicast. Moreover, processor 1422 of apparatus 1420, as the EHT responder, may receive the control frame and perform certain operations. It is noteworthy that the EHT responder may first change the value from Multicast to Unicast and then compare to see whether there is a match, as the MAC address of the EHT responder has the Unicast/Multicast bit set to Unicast. For instance, processor 1422 may change the Unicast/Multicast bit in the RA field of the control frame to Unicast. Additionally, processor 1422 may match the RA field of the control frame with an address of the EHT responder. In response to the RA field of the control frame matching the address of the EHT responder, processor 1422 may perform certain operations. For instance, processor 1422 may change the Unicast/Multicast bit in the TA field of the control frame to Unicast. Additionally, processor 1422 may copy and insert the TA field of the control frame in a RA field of a response frame (e.g., CTS). Moreover, processor 1422 may transmit the response frame to the EHT initiator. In some implementations, either or both of (a) first 7 bits of a scrambling sequence carried in a SERVICE field in the control frame and (b) one or more reserved bits in the SERVICE field may be modified by the EHT initiator and the EHT responder.

In some implementations, in performing the bandwidth negotiation, processor 1412 and processor 1422 may perform the bandwidth negotiation between STA 110 and STA 120 as an EHT initiator and an EHT responder, respectively, by performing certain operations. For instance, processor 1412 of apparatus 1410, as the EHT initiator, may transmit a control frame (e.g., RTS) to the EHT responder, such that: (a) a RA field of the control frame indicates an address of a transmitter of the control frame, and (b) a TA field of the control frame indicates an address of a receiver of the control frame, with a Unicast/Multicast bit in the TA field set to Multicast. Moreover, processor 1422 of apparatus 1420, as the EHT responder, may receive the control frame and perform certain operations. For instance, processor 1422 may change the Unicast/Multicast bit in the TA field of the control frame to Unicast. Additionally, processor 1422 may match the TA field of the control frame with an address of the EHT responder. In response to the TA field of the control frame matching the address of the EHT responder, processor 1422 may perform certain operations. For instance, processor 1422 may copy and insert the RA field of the control frame in a RA field of a response frame (e.g., CTS) carried in a non-HT PPDU. Additionally, processor 1422 may transmit the non-HT PPDU to the EHT initiator. In some implementations, first 7 bits of a scrambling sequence or one or more reserved service bits in the control frame may be modified by the EHT initiator.

In some implementations, in performing the bandwidth negotiation, processor 1412 and processor 1422 may perform the bandwidth negotiation between STA 110 and STA 120 as an EHT initiator and an EHT responder, respectively, by performing certain operations. For instance, processor 1412 of apparatus 1410, as the EHT initiator, may transmit a control frame (e.g., RTS) to the EHT responder, such that: (a) a RA field of the control frame indicates an address of a transmitter of the control frame, with a Unicast/Multicast bit in the RA field set to Multicast, and (b) a TA field of the control frame indicates an address of a receiver of the control frame. Moreover, processor 1422 of apparatus 1420, as the EHT responder, may receive the control frame and match the RA field and the TA field of the control frame with an address of the EHT responder. In response to the TA field of the control frame matching the address of the EHT responder, processor 1422 may perform certain operations. For instance, processor 1422 may change the Unicast/Multicast bit in the RA field of the control frame to Unicast. Additionally, processor 1422 may copy and insert the RA field of the control frame in a RA field of a response frame (e.g., CTS) carried in a non-HT PPDU. Moreover, processor 1422 may transmit the non-HT PPDU to the EHT initiator. In some implementations, first 7 bits of a scrambling sequence or one or more reserved service bits in the control frame may be modified by the EHT initiator.

In some implementations, in performing the bandwidth negotiation, processor 1412 and processor 1422 may perform the bandwidth negotiation between STA 110 and STA 120 as an EHT initiator and an EHT responder, respectively, by performing certain operations. For instance, processor 1412 of apparatus 1410, as the EHT initiator, may transmit a control frame (e.g., RTS) to the EHT responder, such that: (a) a RA field of the control frame indicates an address of a transmitter of the control frame, with an Individual/Group bit in the RA field set to Group; (b) a TA field of the control frame indicates an address of a receiver of the control frame, with an Individual/Group bit in the TA field set to Group. Moreover, processor 1422 of apparatus 1420, as the EHT responder, may receive the control frame and perform certain operations. For instance, processor 1422 may change the Individual/Group bit in the RA field of the control frame to Individual. Additionally, processor 1422 may change the Individual/Group bit in the TA field of the control frame to Individual. Moreover, processor 1422 may match the TA field of the control frame with an address of the EHT responder. In response to the TA field of the control frame matching the address of the EHT responder, processor 1422 may perform certain operations. For instance, processor 1422 may change the Individual/Group bit in the RA field of the control frame to Unicast. Additionally, processor 1422 may copy and insert the RA field of the control frame in a RA field of a response frame (e.g., CTS) carried in a non-HT PPDU. Furthermore, processor 1422 may transmit the non-HT PPDU to the EHT initiator. In some implementations, bits B4~B6 in first 7 bits of a scrambling sequence in the response frame may indicate an available bandwidth.

In some implementations, in performing the bandwidth negotiation, processor 1412 and processor 1422 may exchange a control frame (e.g., RTS) and a response frame (e.g., CTS) between STA 110 and STA 120 for dynamic bandwidth negotiation with no preamble puncturing indication. In such cases, a bandwidth extension indication in a SERVICE field of the control frame may indicate an available bandwidth being greater than 160 MHz (e.g., available bandwidth=320 MHz) when set to 1. Moreover, a bandwidth extension indication in a SERVICE field of the response frame may indicate an available bandwidth being greater than 160 MHz (e.g., available bandwidth=320 MHz) when set to 1 and less than or equal to 160 MHz when set to 0.

In some implementations, in performing the bandwidth negotiation, processor 1412 may exchange a control frame and a response frame between the first STA and the second STA for static bandwidth negotiation with no preamble puncturing indication. In such cases, a bandwidth extension indication in a SERVICE field of the control frame may indicate an available bandwidth greater than 160 MHz when set to 1. Moreover, a bandwidth extension indication in a SERVICE field of the response frame may be set to 1.

In some implementations, in performing the bandwidth negotiation, processor 1412 and processor 1422 may exchange a control frame (e.g., RTS) and a response frame (e.g., CTS) between STA 110 and STA 120 for bandwidth indication with no preamble puncturing indication. In such cases, a MAC address field in a MAC header of the control frame may indicate extending bandwidth signaling. Additionally, bits B5~B6 in first 7 bits of a scrambling sequence carried in a SERVICE field of the control frame may be set to either a fixed value or dynamically set to one of four values to indicate a bandwidth of 320 MHz. Moreover, bits B4~B6 in first 7 bits of a scrambling sequence carried in a SERVICE field of the response frame may indicate a bandwidth of 20 MHz, 40 MHz, 80 MHz, 160 MHz, 80+80 MHz, or 320 MHz.

In some implementations, in performing the bandwidth negotiation, processor 1412 and processor 1422 may exchange a control frame (e.g., RTS) and a response frame (e.g., CTS) between STA 110 and STA 120 carrying EHT bandwidth signaling with a bit B7 in a SERVICE field of the control frame set to either 1 to indicate an extended channel bandwidth of 320 MHz or 0 to indicate a bandwidth equal to or less than 160 MHz. In an event that the bit B7 is set to 1, the bits B5~B6 in first 7 bits of the scrambling sequence may be set to either a fixed value or dynamically set to one of four values. Otherwise, in an event that the bit B7 is set to 0, the bits B5~B6 in first 7 bits of the scrambling sequence may be set to one of four values indicating a bandwidth of 20 MHz, 40 MHz, 80 MHz, or either 160 MHz or 80+80 MHz. For instance, when bit B7 is set to 1, the bandwidth is 320 MHz while bits B5~B6 do not indicate the actual bandwidth for EHT STAs (e.g., STA 110 and STA 120). However, a legacy (non-EHT) STA may take the values of bits B5~B6 as the bandwidth indication.

In some implementations, in performing the bandwidth negotiation, processor 1412 and processor 1422 may perform the bandwidth negotiation between STA 110 and STA 120 as an EHT initiator and an EHT responder, respectively. For instance, processor 1412 of apparatus 1410, as the EHT initiator, may transmit to the EHT responder a 20 MHz, 40 MHz, 80 MHz, 160 MHz or 80+80 MHz VHT RTS frame with a bandwidth signaling TA field. Moreover, processor 1422 of apparatus 1420, as the EHT responder, may transmit to the EHT initiator a VHT CTS frame to perform static or dynamic bandwidth negotiation and indication.

In some implementations, in performing the bandwidth negotiation, processor 1412 and processor 1422 may perform the bandwidth negotiation between STA 110 and STA 120 as an EHT initiator and an EHT responder, respectively. For instance, processor 1412 of apparatus 1410, as the EHT initiator, may transmit to the EHT responder a 320 MHz EHT RTS frame with: (a) an indication of static bandwidth negotiation, (b) a bit B7 in a SERVICE field of the EHT RTS frame set to 1, and (c) a bandwidth signaling TA field. Moreover, processor 1422 of apparatus 1420, as the EHT responder, may transmit to the EHT initiator a 320 MHz EHT CTS frame.

In some implementations, in performing the bandwidth negotiation, processor 1412 and processor 1422 may perform the bandwidth negotiation between STA 110 and STA 120 as an EHT initiator and an EHT responder, respectively. For instance, processor 1412 of apparatus 1410, as the EHT initiator, may transmit to the EHT responder a 320 MHz EHT RTS frame with: (a) an indication of dynamic bandwidth negotiation, (b) a bit B7 in a SERVICE field of the EHT RTS frame set to 1, and (c) a bandwidth signaling TA field. Moreover, processor 1422 of apparatus 1420, as the EHT responder, may perform certain operations. For instance, in an event that a response frame by the EHT responder is of a bandwidth of 320 MHz, processor 1422 may transmit to the EHT initiator a 320 MHz EHT CTS frame. Alternatively, in an event that the response frame by the EHT responder has a bandwidth equal to or less than 160 MHz, processor 1422 may transmit to the EHT initiator a VHT CTS frame.

Illustrative Processes

Figure 15:
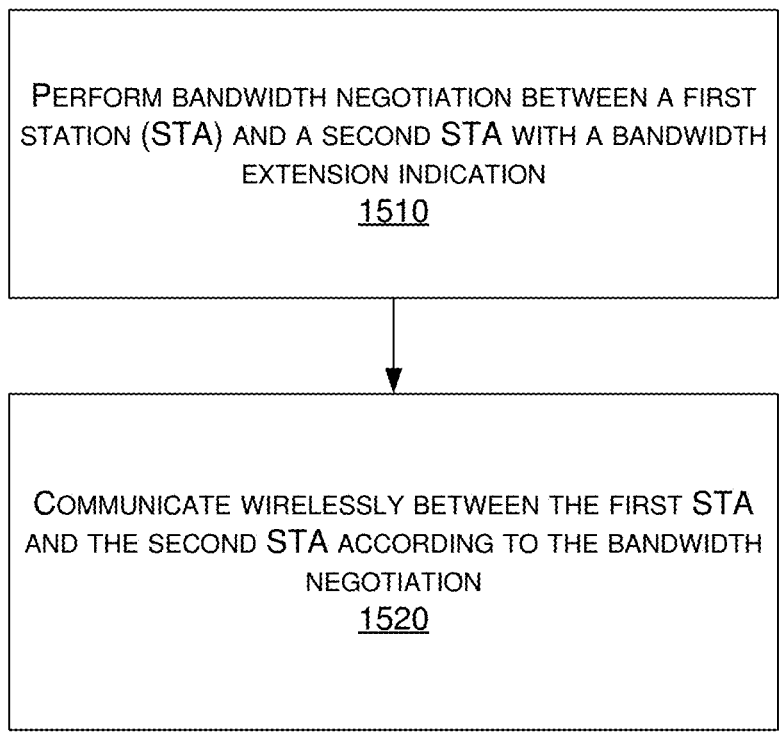
FIG. 15 is a flowchart of an example process in accordance with an implementation of the present disclosure.

FIG. 15 illustrates an example process 1500 in accordance with an implementation of the present disclosure. Process 1500 may represent an aspect of implementing various proposed designs, concepts, schemes, systems and methods described above. More specifically, process 1500 may represent an aspect of the proposed concepts and schemes pertaining to bandwidth extension indication and negotiation in wireless communications in wireless communications in accordance with the present disclosure. Process 1500 may include one or more operations, actions, or functions as illustrated by one or more of blocks 1510 and 1520. Although illustrated as discrete blocks, various blocks of process 1500 may be divided into additional blocks, combined into fewer blocks, or eliminated, depending on the desired implementation. Moreover, the blocks/sub-blocks of process 1500 may be executed in the order shown in FIG. 15 or, alternatively in a different order. Furthermore, one or more of the blocks/sub-blocks of process 1500 may be executed repeatedly or iteratively. Process 1500 may be implemented by or in apparatus 1410 and apparatus 1420 as well as any variations thereof. Solely for illustrative purposes and without limiting the scope, process 1500 is described below in the context of apparatus 1410 implemented in or as STA 110 and apparatus 1420 implemented in or as STA 120 of a wireless network such as a WLAN in network environment 100 in accordance with one or more of IEEE 802.11 standards. It is noteworthy that, although examples described below are provide in the context of apparatus 1410, the examples may also be applicable to apparatus 1420 or otherwise implemented by apparatus 1420. Process 1500 may begin at block 1510.

At 1510, process 1500 may involve processor 1412 of apparatus 1410 performing, via transceiver 1416, bandwidth negotiation between STA 110 and STA 120 with a bandwidth extension indication. Process 1500 may proceed from 1510 to 1520.

At 1520, process 1500 may involve processor 1412 communicating, via transceiver 1416, wirelessly between STA 110 and STA 120 according to the bandwidth negotiation.

In some implementations, in performing the bandwidth negotiation, process 1500 may involve processor 1412 performing the bandwidth negotiation with no preamble puncturing indication by transmitting or receiving a control frame (e.g., RTS) with one bandwidth extension bit in a SERVICE field of the control frame indicating bandwidth extension.

In some implementations, the one bandwidth extension bit may include either a bit (e.g., B3) of first 7 bits of a scrambling sequence carried in the SERVICE field of the control frame or a reserved bit (e.g., B7) in the SERVICE field. In such cases, the bit B3 may be set to either 0 to indicate an operating bandwidth being less than or equal to 160 MHz or 1 to indicate the operating bandwidth being greater than 160 MHz. For instance, two or more bits (e.g., bits B5~B6) of the first 7 bits of the scrambling sequence carried in the SERVICE field of the control frame may indicate an available bandwidth being 20 MHz, 40 MHz, 80 MHz, 160 MHz, 80+80 MHz when the bandwidth extension bit is set to 0. Moreover, the two or more bits (e.g., bits B5~B6) of the first 7 bits of the scrambling sequence carried in the SERVICE field of the control frame may be set to a fixed or variable value to indicate an available bandwidth being 320 MHz when the bandwidth extension bit is set to 1.

In some implementations, in performing the bandwidth negotiation, process 1500 may involve processor 1412 performing the bandwidth negotiation with no preamble puncturing indication by (e.g., when an initiating frame is an EHT frame) receiving or transmitting a response frame (e.g., CTS) with one bandwidth extension bit in a SERVICE field of the response frame indicating an available bandwidth being greater than 160 MHz (e.g., when the available bandwidth is 320 MHz) when set to 1. For instance, bit B4 may be used to indicate transmission bandwidth being greater than 160 MHz. When bandwidth is greater than 160 MHz, bit B4 may be set to 1, and bit B5~B6 may be set to a fixed or variable value. Otherwise, bit B4 may be set to 0 and bits B5~B6 may indicate bandwidth 20 MHz, 40 MHz, 80 MHz, or 160/80+80 MHz.

In some implementations, the bandwidth extension bit of the response frame may be in first 7 bits of a scrambling sequence carried in the SERVICE field or in reserved bits of the SERVICE field.

In some implementations, in performing the bandwidth negotiation, process 1500 may involve processor 1412 performing the bandwidth negotiation with preamble puncturing indication by transmitting or receiving a control frame (e.g., RTS) or a response frame (e.g., CTS) with at least one or more bits in a SERVICE field of the control frame or the response frame indicating an available bandwidth with a preamble puncturing indication. In such cases, two or more bits (e.g., bits B5~B6) in first 7 bits of a scrambling sequence carried in the SERVICE field and a plurality of reserved bits in the SERVICE field (e.g., bits R0~R3) may indicate the available bandwidth with the preamble puncturing indication.

In some implementations, in performing the bandwidth negotiation, process 1500 may involve processor 1412 performing the bandwidth negotiation between STA 110 and STA 120 as an EHT initiator and an EHT responder, respectively, by performing certain operations. For instance, process 1500 may involve processor 1412 of apparatus 1410, as the EHT initiator, transmitting a control frame (e.g., RTS) to the EHT responder, such that: (a) a RA field of the control frame indicates an address of a transmitter of the control frame, and (b) a TA field of the control frame indicates an address of a receiver of the control frame. Moreover, process 1500 may involve processor 1422 of apparatus 1420, as the EHT responder, receiving the control frame and matching the RA field and the TA field of the control frame with an address of the EHT responder. In response to the TA field of the control frame matching the address of the EHT responder, process 1500 may involve processor 1422 performing certain operations. For instance, process 1500 may involve processor 1422 copying and inserting the RA field of the control frame in a RA field of a response frame (e.g., CTS) carried in a non-HT PPDU. Additionally, process 1500 may involve processor 1422 transmitting the non-HT PPDU to the EHT initiator. In some implementations, first 7 bits of a scrambling sequence or one or more reserved service bits in the control frame may be modified by the EHT initiator.

In some implementations, in performing the bandwidth negotiation, process 1500 may involve processor 1412 performing the bandwidth negotiation between STA 110 and STA 120 as an EHT initiator and an EHT responder, respectively, by performing certain operations. For instance, process 1500 may involve processor 1412 of apparatus 1410, as the EHT initiator, transmitting a control frame (e.g., RTS) to the EHT responder with signaling in a MAC header indicating either or both of first 7 bits of a scrambling sequence carried in a SERVICE field in the control frame and one or more reserved bits in the SERVICE field carrying at least bandwidth extension without preamble puncturing indication or bandwidth extension with preamble puncturing indication. In such cases: (a) a TA field of the control frame may indicate an address of a transmitter of the control frame, with a Unicast/Multicast bit in the TA field set to Multicast, and (b) a RA field of the control frame may indicate an address of a receiver of the control frame, with a Unicast/Multicast bit in the RA field set to Multicast. Moreover, process 1500 may involve processor 1422 of apparatus 1420, as the EHT responder, receiving the control frame and performing certain operations. For instance, process 1500 may involve processor 1422 changing the Unicast/Multicast bit in the RA field of the control frame to Unicast. Additionally, process 1500 may involve processor 1422 matching the RA field of the control frame with an address of the EHT responder. In response to the RA field of the control frame matching the address of the EHT responder, process 1500 may involve processor 1422 performing certain operations. It is noteworthy that the EHT responder may first change the value from Multicast to Unicast and then compare to see whether there is a match, as the MAC address of the EHT responder has the Unicast/Multicast bit set to Unicast. For instance, process 1500 may involve processor 1422 changing the Unicast/Multicast bit in the TA field of the control frame to Unicast. Additionally, process 1500 may involve processor 1422 copying and inserting the TA field of the control frame in a RA field of a response frame (e.g., CTS). Moreover, process 1500 may involve processor 1422 transmitting the response frame to the EHT initiator. In some implementations, either or both of (a) first 7 bits of a scrambling sequence carried in a SERVICE field in the control frame and (b) one or more reserved bits in the SERVICE field may be modified by the EHT initiator and the EHT responder.

In some implementations, in performing the bandwidth negotiation, process 1500 may involve processor 1412 performing the bandwidth negotiation between STA 110 and STA 120 as an EHT initiator and an EHT responder, respectively, by performing certain operations. For instance, process 1500 may involve processor 1412 of apparatus 1410, as the EHT initiator, transmitting a control frame (e.g., RTS) to the EHT responder, such that: (a) a RA field of the control frame indicates an address of a transmitter of the control frame, and (b) a TA field of the control frame indicates an address of a receiver of the control frame, with a Unicast/Multicast bit in the TA field set to Multicast. Moreover, process 1500 may involve processor 1422 of apparatus 1420, as the EHT responder, receiving the control frame and performing certain operations. For instance, process 1500 may involve processor 1422 changing the Unicast/Multicast bit in the TA field of the control frame to Unicast. Additionally, process 1500 may involve processor 1422 matching the TA field of the control frame with an address of the EHT responder. In response to the TA field of the control frame matching the address of the EHT responder, process 1500 may involve processor 1422 performing certain operations. For instance, process 1500 may involve processor 1422 copying and inserting the RA field of the control frame in a RA field of a response frame (e.g., CTS) carried in a non-HT PPDU. Additionally, process 1500 may involve processor 1422 transmitting the non-HT PPDU to the EHT initiator. In some implementations, first 7 bits of a scrambling sequence or one or more reserved service bits in the control frame may be modified by the EHT initiator.

In some implementations, in performing the bandwidth negotiation, process 1500 may involve processor 1412 performing the bandwidth negotiation between STA 110 and STA 120 as an EHT initiator and an EHT responder, respectively, by performing certain operations. For instance, process 1500 may involve processor 1412 of apparatus 1410, as the EHT initiator, transmitting a control frame (e.g., RTS) to the EHT responder, such that: (a) a RA field of the control frame indicates an address of a transmitter of the control frame, with a Unicast/Multicast bit in the RA field set to Multicast, and (b) a TA field of the control frame indicates an address of a receiver of the control frame. Moreover, process 1500 may involve processor 1422 of apparatus 1420, as the EHT responder, receiving the control frame and matching the RA field and the TA field of the control frame with an address of the EHT responder. In response to the TA field of the control frame matching the address of the EHT responder, process 1500 may involve processor 1422 performing certain operations. For instance, process 1500 may involve processor 1422 changing the Unicast/Multicast bit in the RA field of the control frame to Unicast. Additionally, process 1500 may involve processor 1422 copying and inserting the RA field of the control frame in a RA field of a response frame (e.g., CTS) carried in a non-HT PPDU. Moreover, process 1500 may involve processor 1422 transmitting the non-HT PPDU to the EHT initiator. In some implementations, first 7 bits of a scrambling sequence or one or more reserved service bits in the control frame may be modified by the EHT initiator.

In some implementations, in performing the bandwidth negotiation, process 1500 may involve processor 1412 performing the bandwidth negotiation between STA 110 and STA 120 as an EHT initiator and an EHT responder, respectively, by performing certain operations. For instance, process 1500 may involve processor 1412 of apparatus 1410, as the EHT initiator, transmitting a control frame (e.g., RTS) to the EHT responder, such that: (a) a RA field of the control frame indicates an address of a transmitter of the control frame, with an Individual/Group bit in the RA field set to Group; (b) a TA field of the control frame indicates an address of a receiver of the control frame, with an Individual/Group bit in the TA field set to Group. Moreover, process 1500 may involve processor 1422 of apparatus 1420, as the EHT responder, receiving the control frame and performing certain operations. For instance, process 1500 may involve processor 1422 changing the Individual/Group bit in the RA field of the control frame to Individual. Additionally, process 1500 may involve processor 1422 changing the Individual/Group bit in the TA field of the control frame to Individual. Moreover, process 1500 may involve processor 1422 matching the TA field of the control frame with an address of the EHT responder. In response to the TA field of the control frame matching the address of the EHT responder, process 1500 may involve processor 1422 performing certain operations. For instance, process 1500 may involve processor 1422 changing the Individual/Group bit in the RA field of the control frame to Unicast. Additionally, process 1500 may involve processor 1422 copying and inserting the RA field of the control frame in a RA field of a response frame (e.g., CTS) carried in a non-HT PPDU. Furthermore, process 1500 may involve processor 1422 transmitting the non-HT PPDU to the EHT initiator. In some implementations, bits B4~B6 in first 7 bits of a scrambling sequence in the response frame may indicate an available bandwidth.

In some implementations, in performing the bandwidth negotiation, process 1500 may involve processor 1412 exchanging a control frame (e.g., RTS) and a response frame (e.g., CTS) between STA 110 and STA 120 for dynamic bandwidth negotiation with no preamble puncturing indication. In such cases, a bandwidth extension indication in a SERVICE field of the control frame may indicate an available bandwidth being greater than 160 MHz (e.g., available bandwidth=320 MHz) when set to 1. Moreover, a bandwidth extension indication in a SERVICE field of the response frame may indicate an available bandwidth being greater than 160 MHz (e.g., available bandwidth=320 MHz) when set to 1 and less than or equal to 160 MHz when set to 0.

In some implementations, in performing the bandwidth negotiation, process 1500 may involve processor 1412 exchanging a control frame and a response frame between the first STA and the second STA for static bandwidth negotiation with no preamble puncturing indication. In such cases, a bandwidth extension indication in a SERVICE field of the control frame may indicate an available bandwidth greater than 160 MHz when set to 1. Moreover, a bandwidth extension indication in a SERVICE field of the response frame may be set to 1.

In some implementations, in performing the bandwidth negotiation, process 1500 may involve processor 1412 exchanging a control frame (e.g., RTS) and a response frame (e.g., CTS) between STA 110 and STA 120 for bandwidth indication with no preamble puncturing indication. In such cases, a MAC address field in a MAC header of the control frame may indicate extending bandwidth signaling. Additionally, bits B5~B6 in first 7 bits of a scrambling sequence carried in a SERVICE field of the control frame may be set to either a fixed value or dynamically set to one of four values to indicate a bandwidth of 320 MHz. Moreover, bits B4~B6 in first 7 bits of a scrambling sequence carried in a SERVICE field of the response frame may indicate a bandwidth of 20 MHz, 40 MHz, 80 MHz, 160 MHz, 80+80 MHz, or 320 MHz.

In some implementations, in performing the bandwidth negotiation, process 1500 may involve processor 1412 exchanging a control frame (e.g., RTS) and a response frame (e.g., CTS) between STA 110 and STA 120 carrying EHT bandwidth signaling with a bit B7 in a SERVICE field of the control frame set to either 1 to indicate an extended channel bandwidth of 320 MHz or 0 to indicate a bandwidth equal to or less than 160 MHz. In an event that the bit B7 is set to 1, the bits B5-B6 in first 7 bits of the scrambling sequence may be set to either a fixed value or dynamically set to one of four values. Otherwise, in an event that the bit B7 is set to 0, the bits B5-B6 in first 7 bits of the scrambling sequence may be set to one of four values indicating a bandwidth of 20 MHz, 40 MHz, 80 MHz, or either 160 MHz or 80+80 MHz. For instance, when bit B7 is set to 1, the bandwidth is 320 MHz while bits B5-B6 do not indicate the actual bandwidth for EHT STAs (e.g., STA 110 and STA 120). However, a legacy (non-EHT) STA may take the values of bits B5-B6 as the bandwidth indication.

In some implementations, in performing the bandwidth negotiation, process 1500 may involve processor 1412 performing the bandwidth negotiation between STA 110 and STA 120 as an EHT initiator and an EHT responder, respectively. For instance, process 1500 may involve processor 1412 of apparatus 1410, as the EHT initiator, transmitting to the EHT responder a 20 MHz, 40 MHz, 80 MHz, 160 MHz or 80+80 MHz VHT RTS frame with a bandwidth signaling TA field. Moreover, process 1500 may involve processor 1422 of apparatus 1420, as the EHT responder, transmitting to the EHT initiator a VHT CTS frame to perform static or dynamic bandwidth negotiation and indication.

In some implementations, in performing the bandwidth negotiation, process 1500 may involve processor 1412 performing the bandwidth negotiation between STA 110 and STA 120 as an EHT initiator and an EHT responder, respectively. For instance, process 1500 may involve processor 1412 of apparatus 1410, as the EHT initiator, transmitting to the EHT responder a 320 MHz EHT RTS frame with: (a) an indication of static bandwidth negotiation, (b) a bit B7 in a SERVICE field of the EHT RTS frame set to 1, and (c) a bandwidth signaling TA field. Moreover, process 1500 may involve processor 1422 of apparatus 1420, as the EHT responder, transmitting to the EHT initiator a 320 MHz EHT CTS frame.

In some implementations, in performing the bandwidth negotiation, process 1500 may involve processor 1412 performing the bandwidth negotiation between STA 110 and STA 120 as an EHT initiator and an EHT responder, respectively. For instance, process 1500 may involve processor 1412 of apparatus 1410, as the EHT initiator, transmitting to the EHT responder a 320 MHz EHT RTS frame with: (a) an indication of dynamic bandwidth negotiation, (b) a bit B7 in a SERVICE field of the EHT RTS frame set to 1, and (c) a bandwidth signaling TA field. Moreover, process 1500 may involve processor 1422 of apparatus 1420, as the EHT responder, performing certain operations. For instance, in an event that a response frame by the EHT responder is of a bandwidth of 320 MHz, process 1500 may involve processor 1422 transmitting to the EHT initiator a 320 MHz EHT CTS frame. Alternatively, in an event that the response frame by the EHT responder has a bandwidth equal to or less than 160 MHz, process 1500 may involve processor 1422 transmitting to the EHT initiator a VHT CTS frame.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
  performing bandwidth negotiation between a first station (STA) and a second STA with a bandwidth extension indication; and
  communicating wirelessly between the first STA and the second STA according to the bandwidth negotiation,
  wherein the performing of the bandwidth negotiation comprises exchanging a control frame and a response frame between the first STA and the second STA carrying extreme-high-throughput (EHT) bandwidth signaling with a bit B7 in a SERVICE field of the control frame set to either 1 to indicate an extended channel bandwidth of 320 MHz or 0 to indicate a bandwidth equal to or less than 160 MHz and
  wherein:
    in an event that the bit B7 is set to 1, bits B5~B6 in first 7 bits of a scrambling sequence are set to either a fixed value or dynamically set to one of four values, and
    in an event that the bit B7 is set to 0, the bits B5~B6 in the first 7 bits of the scrambling sequence are set to one of the four values indicating a bandwidth of 20 MHz, 40 MHz, 80 MHz, or either 160 MHz or 80+80 MHz.

2. The method of claim 1, wherein the performing of the bandwidth negotiation further comprises performing the bandwidth negotiation with no preamble puncturing indication by transmitting or receiving the control frame with one bandwidth extension bit in the SERVICE field of the control frame indicating bandwidth extension.

3. The method of claim 2, wherein the one bandwidth extension bit comprises either a bit of the first 7 bits of the scrambling sequence carried in the SERVICE field of the control frame or a reserved bit in the SERVICE field, and wherein the one bandwidth extension bit is set to either 0 to indicate an operating bandwidth being less than or equal to 160 MHz or 1 to indicate the operating bandwidth being greater than 160 MHz.

4. The method of claim 1, wherein the performing of the bandwidth negotiation further comprises performing the bandwidth negotiation with no preamble puncturing indication by receiving or transmitting the response frame with one bandwidth extension bit in a SERVICE field of the response frame indicating an available bandwidth being greater than 160 MHz when set to 1.

5. The method of claim 4, wherein the one bandwidth extension bit of the response frame is in the first 7 bits of the scrambling sequence carried in the SERVICE field or in reserved bits of the SERVICE field.

6. The method of claim 1, wherein the performing of the bandwidth negotiation further comprises performing the bandwidth negotiation with preamble puncturing indication by transmitting or receiving the control frame or the response frame with at least one or more bits in the SERVICE field of the control frame or the response frame indicating an available bandwidth with the preamble puncturing indication.

7. The method of claim 6, wherein two or more bits in the first 7 bits of the scrambling sequence carried in the SERVICE field and a plurality of reserved bits in the SERVICE field indicate the available bandwidth with the preamble puncturing indication.

8. The method of claim 1, wherein the performing of the bandwidth negotiation further comprises performing the bandwidth negotiation between the first STA and the second STA as an EHT initiator and an EHT responder, respectively, by:
 the EHT initiator transmitting the control frame to the EHT responder with signaling in a medium access control (MAC) header indicating either or both of the first 7 bits of the scrambling sequence carried in the SERVICE field in the control frame and one or more reserved bits in the SERVICE field carrying at least bandwidth extension without preamble puncturing indication or bandwidth extension with preamble puncturing indication.

9. The method of claim 8, wherein:
 a Transmitter Address (TA) field of the control frame indicates an address of a transmitter of the control frame, with a Unicast/Multicast bit in the TA field set to Multicast, and
 a Receiver Address (RA) field of the control frame indicates an address of a receiver of the control frame, with a Unicast/Multicast bit in the RA field set to Multicast;
 the EHT responder receives the control frame and performs operations comprising:
  changing the Unicast/Multicast bit in the RA field of the control frame to Unicast;
  matching the RA field of the control frame with an address of the EHT responder;
  responsive to the RA field of the control frame matching the address of the EHT responder performs operations comprising:
   changing the Unicast/Multicast bit in the TA field of the control frame to Unicast;
   copying and inserting the TA field of the control frame in a RA field of a response frame; and
   transmitting the response frame to the EHT initiator.

10. The method of claim 1, wherein the performing of the bandwidth negotiation further comprises exchanging the control frame and the response frame between the first STA and the second STA for dynamic bandwidth negotiation with no preamble puncturing indication, wherein the bandwidth extension indication in the SERVICE field of the control frame indicates an available bandwidth greater than 160 MHz when set to 1, and wherein the bandwidth extension indication in a SERVICE field of the response frame indicates an available bandwidth greater than 160 MHz when set to 1 and less than or equal to 160 MHz when set to 0.

11. The method of claim 1, wherein the performing of the bandwidth negotiation further comprises exchanging the control frame and the response frame between the first STA and the second STA for static bandwidth negotiation with no preamble puncturing indication, wherein the bandwidth extension indication in the SERVICE field of the control frame indicate an available bandwidth greater than 160 MHz when set to 1, and wherein the bandwidth extension indication in a SERVICE field of the response frame sets to 1.

12. The method of claim 1, wherein the performing of the bandwidth negotiation further comprises exchanging the control frame and the response frame between the first STA and the second STA for bandwidth indication with no preamble puncturing indication, wherein a medium access control (MAC) address field in a MAC header of the control frame indicates extending bandwidth signaling, wherein the bits B5~B6 in the first 7 bits of the scrambling sequence carried in the SERVICE field of the control frame are set to either a fixed value or dynamically set to one of four values to indicate a bandwidth of 320 MHz, and wherein bits B4~B6 in the first 7 bits of the scrambling sequence carried in a SERVICE field of the response frame indicate a bandwidth of 20 MHz, 40 MHz, 80 MHz, 160 MHz, 80+80 MHz, or 320 MHz.

13. The method of claim 1, wherein the performing of the bandwidth negotiation further comprises performing the bandwidth negotiation between the first STA and the second STA as an EHT initiator and an EHT responder, respectively, by:
 the EHT initiator transmitting to the EHT responder a 20 MHz, 40 MHz, 80 MHz, 160 MHz or 80+80 MHz very-high-throughput (VHT) request-to-send (RTS) frame with a bandwidth signaling Transmitter Address (TA) field; and
 the EHT responder transmitting to the EHT initiator a VHT clear-to-send (CTS) frame to perform static or dynamic bandwidth negotiation and indication.

14. The method of claim 1, wherein the performing of the bandwidth negotiation further comprises performing the bandwidth negotiation between the first STA and the second STA as an EHT initiator and an EHT responder, respectively, by:
 the EHT initiator transmitting to the EHT responder a 320 MHz EHT request-to-send (RTS) frame with:
  an indication of static bandwidth negotiation,
  a bit B7 in a SERVICE field of the EHT RTS frame set to 1, and
  a bandwidth signaling Transmitter Address (TA) field; and
 the EHT responder transmitting to the EHT initiator a 320 MHz EHT clear-to-send (CTS) frame.

15. The method of claim 1, wherein the performing of the bandwidth negotiation further comprises performing the bandwidth negotiation between the first STA and the second STA as an EHT initiator and an EHT responder, respectively, by:

the EHT initiator transmitting to the EHT responder a 320 MHz EHT request-to-send (RTS) frame with:
an indication of dynamic bandwidth negotiation,
a bit B7 in a SERVICE field of the EHT RTS frame set to 1, and
a bandwidth signaling Transmitter Address (TA) field; and either:
in an event that a response frame by the EHT responder is of a bandwidth of 320 MHz, the EHT responder transmitting to the EHT initiator a 320 MHz EHT clear-to-send (CTS) frame; or
in an event that the response frame by the EHT responder has a bandwidth equal to or less than 160 MHz, the EHT responder transmitting to the EHT initiator a very-high-throughput (VHT) CTS frame.

16. An apparatus, comprising:
a transceiver configured to communicate wirelessly; and
a processor coupled to the transceiver and configured to perform, via the transceiver, operations comprising:
performing bandwidth negotiation between a first station (STA) and a second STA with a bandwidth extension indication; and
communicating wirelessly between the first STA and the second STA according to the bandwidth negotiation,
wherein, in performing the bandwidth negotiation, the processor is configured to exchange a control frame and a response frame between the first STA and the second STA carrying extreme-high-throughput (EHT) bandwidth signaling with a bit B7 in a SERVICE field of the control frame set to either 1 to indicate an extended channel bandwidth of 320 MHz or 0 to indicate a bandwidth equal to or less than 160 MHz and
wherein:
in an event that the bit B7 is set to 1, bits B5~B6 in first 7 bits of a scrambling sequence are set to either a fixed value or dynamically set to one of four values, and
in an event that the bit B7 is set to 0, the bits B5~B6 in the first 7 bits of the scrambling sequence are set to one of the four values indicating a bandwidth of 20 MHz, 40 MHz, 80 MHz, or either 160 MHz or 80+80 MHz.

17. The apparatus of claim 16, wherein, in performing the bandwidth negotiation, the processor is further configured to perform the bandwidth negotiation with no preamble puncturing indication by transmitting or receiving the control frame with one bandwidth extension bit in the SERVICE field of the control frame indicating bandwidth extension, wherein the one bandwidth extension bit comprises either a bit of the first 7 bits of the scrambling sequence carried in the SERVICE field of the control frame or a reserved bit in the SERVICE field, and wherein the one bandwidth extension bit is set to either 0 to indicate an operating bandwidth being less than or equal to 160 MHz or 1 to indicate the operating bandwidth being greater than 160 MHz.

18. The apparatus of claim 16, wherein, in performing the bandwidth negotiation, the processor is further configured to perform the bandwidth negotiation with no preamble puncturing indication by receiving or transmitting the response frame with one bandwidth extension bit in a SERVICE field of the response frame indicating an available bandwidth being greater than 160 MHz when set to 1, and wherein the bandwidth negotiation comprises extension bit of the response frame is in the first 7 bits of the scrambling sequence carried in the SERVICE field or in reserved bits of the SERVICE field.

19. The apparatus of claim 16, wherein, in performing the bandwidth negotiation, the processor is further configured to perform the bandwidth negotiation with preamble puncturing indication by transmitting or receiving the control frame or the response frame with at least one or more bits in the SERVICE field of the control frame or the response frame indicating an available bandwidth with a preamble puncturing indication, and wherein two or more bits in the first 7 bits of the scrambling sequence carried in the SERVICE field and a plurality of reserved bits in the SERVICE field indicate the available bandwidth with the preamble puncturing indication.

* * * * *